(12) United States Patent
Uchimura

(10) Patent No.: US 8,849,102 B2
(45) Date of Patent: Sep. 30, 2014

(54) PLAYBACK APPARATUS, PLAYBACK METHOD, AND PLAYBACK PROGRAM

(75) Inventor: Kouichi Uchimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1890 days.

(21) Appl. No.: 11/758,351

(22) Filed: Jun. 5, 2007

(65) Prior Publication Data
US 2007/0280295 A1 Dec. 6, 2007

(30) Foreign Application Priority Data
Jun. 6, 2006 (JP) ................. 2006-156905

(51) Int. Cl.
*H04N 5/917* (2006.01)
*G11B 27/30* (2006.01)

(52) U.S. Cl.
CPC .... *G11B 27/3027* (2013.01); *G11B 2220/2541* (2013.01)
USPC ........................................................ 386/356

(58) Field of Classification Search
CPC .................... G11B 2220/2541; G11B 27/3027
See application file for complete search history.

(56) References Cited

U.S. PATENT DOCUMENTS

| | | |
|---|---|---|
| 2004/0081434 A1 | 4/2004 | Jung et al. |
| 2005/0105888 A1 | 5/2005 | Hamada et al. |
| 2006/0050088 A1* | 3/2006 | Yahata et al. ................. 345/638 |
| 2006/0098742 A1* | 5/2006 | Meenakshisundaram et al. ........................ 375/240.27 |

FOREIGN PATENT DOCUMENTS

| | | |
|---|---|---|
| JP | 2005-204315 A | 7/2005 |
| JP | 2006-503520 A | 1/2006 |
| WO | WO 2005/079064 A1 | 8/2005 |

OTHER PUBLICATIONS

Japanese Office Action issued on Dec. 14, 2010 in corresponding Japanese Application No. 2006-156905.
U.S. Appl. No. 11/758,367, filed Jun. 5, 2007, Uchimura.

\* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

A playback apparatus includes the following elements. An input receives content data and accompanying data formed on the basis of a plurality of first units and used for displaying information accompanying the content data. A first storage section stores, among the plurality of first units forming the accompanying data received by the input section, a first unit in which decoding time information concerning a decoding time is defined. A time information storage section stores the decoding time information. A decoder extracts the first unit from the first storage section and decodes the first unit in accordance with the decoding time information stored in the time information storage section. A second storage section stores the first unit decoded by the decoder. The time information storage section at least has a capacity based on an upper limit of the number of first units stored in the first storage section.

17 Claims, 29 Drawing Sheets

| ITEM | DEFINITION |
|---|---|
| MOVING PICTURE PLANE | 1920×1080×16 BITS, YCbCr (4:2:2) EACH 8 BITS |
| SUBTITLE PLANE | 1920×1080×8 BITS, 8-BIT COLOR MAP ADDRESS (PALETTE) + 256 ALPHA BLENDING |
| INTERACTIVE GRAPHICS PLANE | 1920×1080×8 BITS, 8-BIT COLOR MAP ADDRESS (PALETTE) + 256 ALPHA BLENDING |

FIG. 12

| INPUT | INPUT ADDRESS    8 BITS |
|---|---|
| OUTPUT | OUTPUT DATA    8 BITS × 4 (R, G, B, α) OUTPUT |

FIG. 13

| | THREE PRIMARY COLORS | | | OPACITY |
|---|---|---|---|---|
| COLOR INDEX VALUE | R | G | B | α |
| 0x00 | 0 | 0 | 0 | 0 |
| 0x01 | 10 | 100 | 30 | 0.5 |
| ⋮ | ⋮ | ⋮ | ⋮ | |
| ⋮ | ⋮ | ⋮ | ⋮ | |
| 0xFF | 200 | 255 | 100 | 0.8 |

FIG. 19

| SYNTAX | DATA LENGTH (BITS) | MNEMONIC |
|---|---|---|
| presentation_composition_segment() { | | |
|     segment_descriptor() | | |
|     video_descriptor() | | |
|     composition_descriptor() | | |
|     palette_update_flag | 1 | bslbf |
|     reserved | 7 | bslbf |
|     palette_id_ref | 8 | uimsbf |
|     number_of_composition_objects | 8 | uimsbf |
|     for (i=0; i<number_of_composition_objects; i++) { | | |
|         composition_object() | | |
|     } | | |
| } | | |

FIG. 20

| SYNTAX | DATA LENGTH (BITS) | MNEMONIC |
|---|---|---|
| composition_object() { | | |
|     object_id_ref | 16 | uimsbf |
|     window_id_ref | 8 | uimsbf |
|     object_cropped_flag | 1 | bslbf |
|     forced_on_flag | 1 | bslbf |
|     Reserved | 6 | bslbf |
|     composition_object_horizontal_position | 16 | uimsbf |
|     composition_object_vertical_position | 16 | uimsbf |
|     if (object_cropped_flag==1$_b$) { | | |
|         cropping_rectangle() { | | |
|             object_cropping_horizontal_position | 16 | uimsbf |
|             object_cropping_vertical_position | 16 | uimsbf |
|             object_cropping_width | 16 | uimsbf |
|             object_cropping_height | 16 | uimsbf |
|         } | | |
|     } | | |
| } | | |

FIG. 21

| SYNTAX | DATA LENGTH (BITS) | MNEMONIC |
|---|---|---|
| window_definition_segment() { | | |
|     segment_descriptor() | | |
|     number_of_windows | 8 | uimsbf |
|     for (i=0; i<number_of_windows; i++) { | | |
|         window() | | |
|     } | | |
| } | | |

FIG. 22

| SYNTAX | DATA LENGTH (BITS) | MNEMONIC |
|---|---|---|
| window() { | | |
|     window_id | 8 | uimsbf |
|     window_horizontal_position | 16 | uimsbf |
|     window_vertical_position | 16 | uimsbf |
|     window_width | 16 | uimsbf |
|     window_height | 16 | uimsbf |
| } | | |

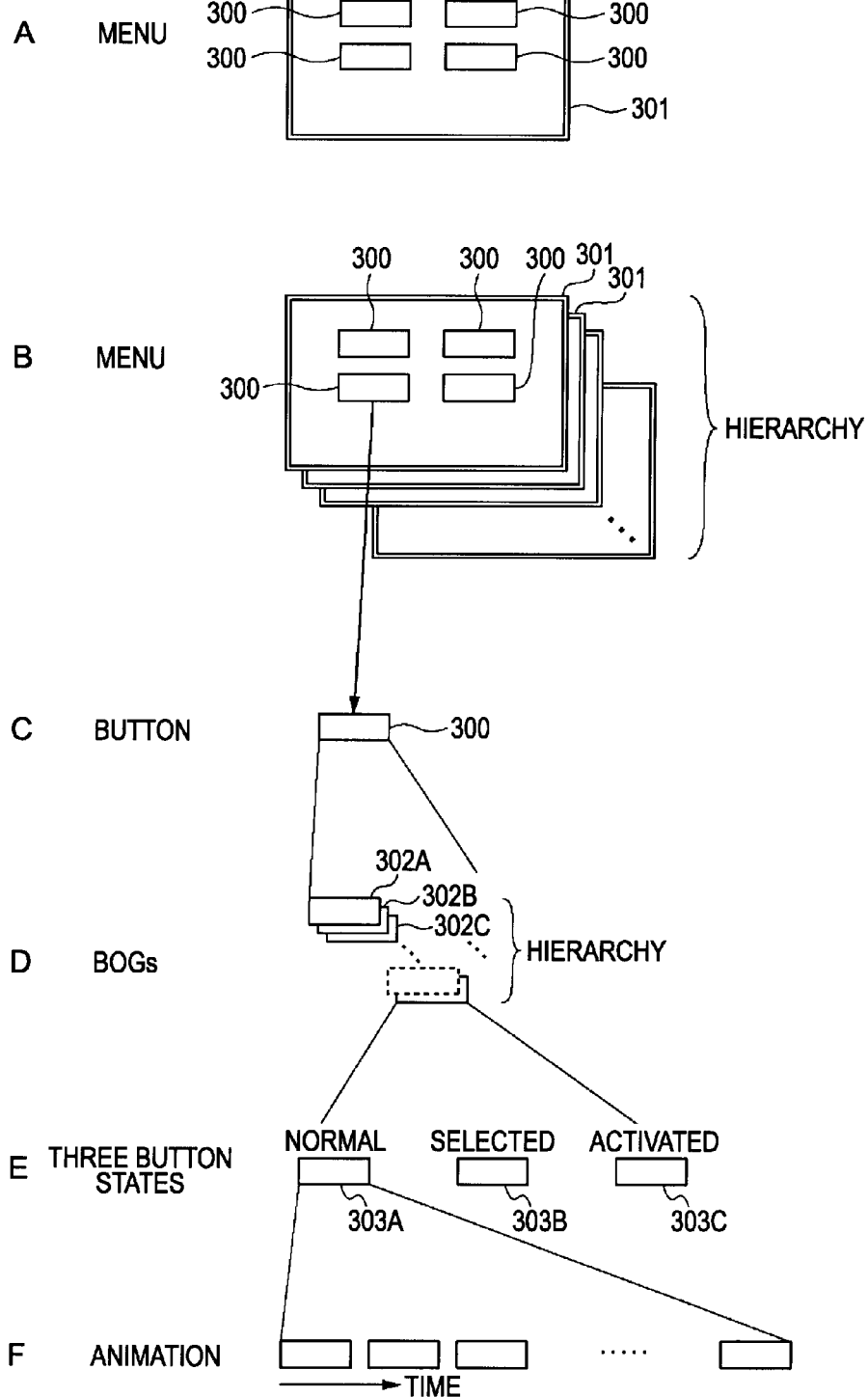

FIG. 24

| SYNTAX | DATA LENGTH (BITS) | MNEMONIC |
|---|---|---|
| interactive_composition_segment() { | | |
|     segment_descriptor() | | |
|     video_descriptor() | | |
|     composition_descriptor() | | |
|     sequence_descriptor() | | |
|     interactive_composition_data_fragment() | | |
| } | | |

FIG. 25

| SYNTAX | DATA LENGTH (BITS) | MNEMONIC |
|---|---|---|
| interactive_composition() { | | |
|     interactive_composition_length | 24 | uimsbf |
|     stream_model | 1 | bslbf |
|     user_interface_model | 1 | bslbf |
|     Reserved | 6 | bslbf |
|     If (stream_model == '0$_b$' ) { | | |
|         Reserved | 7 | bslbf |
|         composition_time_out_pts | 33 | uimsbf |
|         Reserved | 7 | bslbf |
|         selection_time_out_pts | 33 | uimsbf |
|     } | | |
|     user_time_out_duration | 24 | uimsbf |
|     number_of_pages | 8 | uimsbf |
|     for (i=0; i<number_of_pages; i++) { | | |
|         page() | | |
|     } | | |
| } | | |

FIG. 26

| SYNTAX | DATA LENGTH (BITS) | MNEMONIC |
|---|---|---|
| page() { | | |
|     page_id | 8 | uimsbf |
|     page_version_number | 8 | uimsbf |
|     UO_mask_table() | | |
|     in_effects() { | | |
|         effect_sequence() | | |
|     } | | |
|     out_effects() { | | |
|         effect_sequence() | | |
|     } | | |
|     animation_frame_rate_code | 8 | uimsbf |
|     default_selected_button_id_ref | 16 | uimsbf |
|     default_activated_button_id_ref | 16 | uimsbf |
|     palette_id_ref | 8 | uimsbf |
|     number_of_BOGs | 8 | uimsbf |
|     for (i=0; i<number_of_BOGs; i++) { | | |
|         button_overlap_group() | | |
|     } | | |
| } | | |

FIG. 27

| SYNTAX | DATA LENGTH (BITS) | MNEMONIC |
|---|---|---|
| button_overlap_group() { | | |
|     default_valid_button_id_ref | 16 | uimsbf |
|     number_of_buttons | 8 | uimsbf |
|     for (i=0; i<number_of_buttons; i++) { | | |
|         button() | | |
|     } | | |
| } | | |

FIG. 28

| SYNTAX | DATA LENGTH (BITS) | MNEMONIC |
|---|---|---|
| button() { | | |
|     button_id | 16 | uimsbf |
|     button_numeric_select_value | 16 | uimsbf |
|     auto_action_flag | 1 | bslbf |
|     reserved | 7 | bslbf |
|     button_horizontal_position | 16 | uimsbf |
|     button_vertical_position | 16 | uimsbf |
|     neighbor_info() { | | |
|         upper_button_id_ref | 16 | uimsbf |
|         lower_button_id_ref | 16 | uimsbf |
|         left_button_id_ref | 16 | uimsbf |
|         right_button_id_ref | 16 | uimsbf |
|     } | | |
|     normal_state_info() { | | |
|         normal_start_object_id_ref | 16 | uimsbf |
|         normal_end_object_id_ref | 16 | uimsbf |
|         normal_repeat_flag | 1 | bslbf |
|         normal_complete_flag | 1 | bslbf |
|         reserved | 6 | bslbf |
|     } | | |
|     selected_state_info() { | | |
|         selected_state_sound_id_ref | 8 | uimsbf |
|         selected_start_object_id_ref | 16 | uimsbf |
|         selected_end_object_id_ref | 16 | uimsbf |
|         selected_repeat_flag | 1 | bslbf |
|         selected_complete_flag | 1 | bslbf |
|         reserved | 6 | bslbf |
|     } | | |
|     activated_state_info() { | | |
|         activated_state_sound_id_ref | 8 | uimsbf |
|         activated_start_object_id_ref | 16 | uimsbf |
|         activated_end_object_id_ref | 16 | uimsbf |
|     } | | |
|     number_of_navigation_commands | 16 | uimsbf |
|     for (i=0; i<number_of_navigation_commands; i++) { | | |
|         navigation_command() | | |
|     } | | |
| } | | |

FIG. 33

| SEGMENT ID | DTS | PTS | (VERSION) | (SEGMENT TYPE) |
|---|---|---|---|---|
| (16 BITS) | 33 BITS | 33 BITS | (8 BITS) | (4 BITS) |

PCS, ICS, PDS, WDS, ODS

| SEGMENT | UPPER LIMIT (NUMBER OF SEGMENTS) |
|---|---|
| PCS | 8 |
| WDS | 1 |
| PDS | 8 |
| ODS | 64 |
| END | 8 |

| SEGMENT | UPPER LIMIT (NUMBER OF SEGMENTS) |
|---|---|
| ICS | 1 |
| PDS | 256 |
| ODS | 4096 |
| END | 1 |

PLAYBACK APPARATUS, PLAYBACK METHOD, AND PLAYBACK PROGRAM

CROSS REFERENCES TO RELATED APPLICATIONS

The present invention contains subject matter related to Japanese Patent Application JP 2006-156905 filed in the Japanese Patent Office on Jun. 6, 2006, the entire contents of which are incorporated herein by reference.

BACKGROUND OF THE INVENTION

1. Field of the Invention

The present invention relates to a playback apparatus and a playback method for playing back streams in which subtitle data or button data is multiplexed with video data or audio data recorded on a large-capacity recording medium, such as Blu-ray DiSc™. The invention also relates to a playback program implementing the playback method.

2. Description of the Related Art

As the standards of disc-type recording media which are removable from recording/playback apparatuses, Blu-ray Disc standards have been proposed. According to the Blu-ray Disc standards, 12-cm discs having a cover layer of 0.1 mm are used as recording media, and objective lenses having a blue-violet laser of a wavelength of 405 nm and an numerical aperture of 0.85 are used as optical systems so that a maximum of 27 gigabytes (GB) recording capacity is implemented. This makes it possible to record Japanese-standard broadcasting satellite (BS) digital high-definition (HD) programs for more than two hours without deteriorating the image quality.

As the sources for supplying audio/video (AV) signals to be recorded on such optical discs, two types of sources are assumed: one type is a source for supplying analog signals transmitted by analog television broadcasting and the other type is a source for supplying digital signals transmitted by digital television broadcasting. According to the Blu-ray Disc standards, the standards for recording AV signals by the two types of broadcasting systems have already been defined.

As the derivative standards of the current Blu-ray Disc, read-only recording media on which movies or music are recorded are being developed. As disc-type recording media for recording movies or music, digital versatile discs (DVDs) have already been used widely. However, read-only optical discs based on the Blu-ray Disc standards are superior to known DVDs since they can record HD video for more than two hours while maintaining the high image quality by taking advantage of characteristics unique to the Blu-ray Disc, such as the large capacity and high transfer speed.

The standards of read-only recording media based on Blu-ray Disc are hereinafter referred to as the Blu-ray Disc Read-Only Memory Format (BD-ROM) standards.

One of the indispensable elements for the content recorded on read-only recording media is subtitles. In the BD-ROM standards, subtitles are displayed on a plane different from a plane on which a moving picture is displayed, and by combining the subtitle plane with the moving picture plane, the subtitles and the moving picture can be displayed by being superposed on each other. For example, the subtitle plane is overlaid on the moving picture plane, and in the subtitle plane, the portions other than the subtitles are made transparent. Then, one piece of image data in which subtitles are displayed on a moving picture can be formed.

To record the content, such as a movie, on a disc and offer the disc for sale as a package media, a user interface for controlling the execution of various programs that accompany the content is recorded together with the content on the disc. A typical user interface is a menu displayed on a screen. As an example of a menu displayed on a screen, buttons for selecting functions are provided as a button image, and the user can select and set one of the buttons through a predetermined input unit, and then, the function assigned to the selected button is executed. Generally, by using a cross key provided for a remote control commander compatible with a player, the user selects a button displayed on a screen and presses a setting key. Then, the function associated with the button is executed.

Japanese Unexamined Patent Application Publication No. 2004-304767 discloses the following techniques. In the technique disclosed in this publication, on the basis of recording/playback standards, i.e., the Blu-ray Disc standards (Blu-ray Disc Rewritable Format Ver1.0), a moving picture plane for displaying a moving picture and a subtitle plane for displaying subtitles are separately provided. Then, the moving picture based on video data and the subtitles based on subtitle image data are displayed together on one screen. Additionally, a technique for displaying a menu on a screen by the use of a button image is also disclosed.

According to the BD-ROM standards, video data or audio data is recorded on a disc in the form of a transport stream (TS), which is defined in Moving Pictures Experts Group 2 (MPEG2) systems. More specifically, video data or audio data is divided into packetized elementary stream (PES) packets, and the PES packets are further divided into portions having a predetermined size, and a header having identification information (packet identification (PID)) indicating the data type is appended to each divided portion. Then, a 188-byte TS packet is formed. The TS packets are then multiplexed and recorded on a disc.

The above-described subtitle image data and image data for displaying a menu screen or commands are also divided into PES packets according to a predetermined unit and are further divided into portions having a predetermined size. Then, header information having a PID is appended to each divided portion, resulting in a TS packet. The TS packets are then multiplexed with video data or audio data, and the multiplexed data is recorded on a disc.

Details of the recording of data on a disc are further given below in the context of subtitle image data. Subtitle image data is formed of units, which are divided by the breakpoints intended by the author, and each unit is stored in a PES packet. In this case, the subtitle image data includes a plurality of data items, such as the subtitles formed of, for example, bitmap data, information concerning where and how the subtitle image data are displayed, and information concerning the display frame that defines the frame of the subtitle image data. The plurality of data items are separately stored in the corresponding PES packets. A plurality of data items forming subtitle image data are hereinafter generically referred to as "subtitle image data".

A decoding time stamp (DTS) and a presentation time stamp (PTS) indicating the decoding time and the display time, respectively, of subtitle image data filled into a PES packet are stored in a PES header, which is the header of the PES packet. The PES packet is further divided into portions having a predetermined size, and the PID indicating the data type is appended to each divided portion, resulting in a TS packet. The TS packet is then multiplexed with a TS packet of video data and audio data and a TS packet of button image data, which is discussed below, and the multiplexed packets are then recorded on a disc.

Data for displaying a menu screen is processed similarly to the subtitle image data. A plurality of data for displaying a menu screen are separately formed into PES packets, and then, the PES packets are divided into portions having a predetermined size. The PID is then appended to each divided portion, resulting in a TS packet.

To display the above-described subtitle image data by playing back the disc, the transport stream is read from the disc and the header is extracted from each TS packet to obtain the PID. The TS packets storing the subtitle image data are then separated on the basis of the obtained PIDs and are temporarily stored in a buffer. When a sufficient number of TS packets that can be reconstructed into a PES packet are stored in the buffer, data is extracted from the payloads of the same type of TS packets on the basis of the associated PIDs so that the PES packet is reconstructed. The PES header is then removed from the reconstructed PES packet, and a plurality of data forming the subtitle image data are reconstructed.

The reconstructed plurality of data forming the subtitle image data are temporarily stored in a decode buffer. The data is then read from the decode buffer at the time represented by the DTS stored in the PES header and are decoded. The decoded data is then stored in an output buffer. The data stored in the output buffer is output at the time represented by the PTS stored in the PES header.

SUMMARY OF THE INVENTION

As described above, the decoding time and the output time of the subtitle image data are specified by the DTS and the PTS, respectively, stored in the PES header. Accordingly, it is necessary to store, in a memory, the DTS and the PTS associated with the subtitle image data stored in the decode buffer until, for example, the decoded data is output from the output buffer.

As discussed above, however, the subtitle image data is formed of units, which are divided based on the breakpoints intended by the author. Accordingly, the size of each unit forming the subtitle image data is different. It is thus difficult to estimate how many data items forming the subtitle image data to be stored in the decode buffer, and it is thus difficult to estimate the capacity of a memory for storing the DTS and the PTS in relation to the capacity of the decode buffer. The same applies to data for displaying a menu screen.

To overcome this drawback, it is possible to use a memory having a capacity large enough to store the DTS and the PTS. This, however, increases the cost of the player.

It is thus difficult to suitably design and configure a decoder for decoding subtitle image data or menu screen data whose decoding time and output time are specified according to the breakpoint of the subtitles or menu screen data.

It is thus desirable to provide a playback apparatus including a decoder suitable for decoding subtitle image data or menu screen data whose decoding time and output time are specified according to the breakpoint of the subtitles or menu screen, and also to provide a playback method and a playback program for the playback apparatus.

According to an embodiment of the present invention, there is provided a playback apparatus including an input section that receives content data and accompanying data which is formed on the basis of a plurality of first units, the accompanying data being used for displaying information accompanying the content data, a first storage section that stores, among the plurality of first units forming the accompanying data received by the input section, a first unit in which decoding time information concerning a decoding time is defined, a time information storage section that stores the decoding time information, a decoder that extracts the first unit from the first storage section and decodes the first unit in accordance with the decoding time information stored in the time information storage section, and a second storage section that stores the first unit decoded by the decoder. The time information storage section at least has a capacity based on an upper limit of the number of first units stored in the first storage section.

According to another embodiment of the present invention, there is provided a playback method including the steps of receiving content data and accompanying data which is formed on the basis of a plurality of first units, the accompanying data being used for displaying information accompanying the content data, storing in a first storage section, among the plurality of first units forming the received accompanying data, a first unit in which decoding time information concerning a decoding time is defined, storing the decoding time information in a time information storage section, extracting the first unit from the first storage section and decoding the first unit in accordance with the decoding time information stored in the time information storage section, and storing the decoded first unit in a second storage section. The time information storage section is capable of storing at least the decoding time information based on an upper limit of the number of first units stored in the second storage section.

According to another embodiment of the present invention, there is provided a playback program allowing a computer to execute a playback method including the steps of receiving content data and accompanying data which is formed on the basis of a plurality of first units, the accompanying data being used for displaying information accompanying the content data, storing in a first storage section, among the plurality of first units forming the received accompanying data, a first unit in which decoding time information concerning a decoding time is defined, storing the decoding time information in a time information storage section, extracting the first unit from the first storage section and decoding the first unit in accordance with the decoding time information stored in the time information storage section, and storing the decoded first unit in a second storage section. The time information storage section is capable of storing at least the decoding time information based on an upper limit of the number of first units stored in the second storage section.

As described above, according to an embodiment of the present invention, content data and accompanying data which is formed on the basis of a plurality of first units, the accompanying data being used for displaying information accompanying the content data, are received. Among the plurality of first units forming the received accompanying data, a first unit in which decoding time information concerning a decoding time is defined is stored in the first storage section. The decoding time information is stored in a time information storage section. The first unit is extracted from the first storage section and decoded in accordance with the decoding time information stored in the time information storage section. The decoded first unit is stored in a second storage section. The time information storage section at least has a capacity based on the upper limit of the number of first units stored in the first storage section. With this configuration, the capacity of the time information storage section can easily be estimated so that a suitable decoder can be provided.

BRIEF DESCRIPTION OF THE DRAWINGS

FIG. 12 schematically illustrates an example of input/output data of a palette;

FIG. 13 schematically illustrates an example of a palette table stored in a palette;

FIG. 19 schematically illustrates the syntax representing an example of the structure of a presentation composition segment (PCS);

FIG. 20 schematically illustrates the syntax representing an example of the structure of the block composition_object( );

FIG. 21 schematically illustrates the syntax representing an example of the structure of a window definition segment (WDS);

FIG. 22 schematically illustrates the syntax representing an example of the structure of the block window( );

FIG. 23 schematically illustrates the configurations of a menu screen and buttons;

FIG. 24 schematically illustrates the syntax representing an example of the structure of header information of an interactive composition segment (ICS);

FIG. 25 schematically illustrates the syntax representing an example of the structure of the block interactive_composition_data_fragment( );

FIG. 26 schematically illustrates the syntax representing an example of the structure of the block page( );

FIG. 27 schematically illustrates the syntax representing an example of the structure of the block button_overlap_group( );

FIG. 28 schematically illustrates the syntax representing an example of the structure of the block button( );

FIG. 33 schematically illustrates an example of the configuration of data stored in a PTS/DTS buffer;

FIGS. 34A and 34B schematically illustrate examples of upper limits of the numbers of segments of PG data and IG data, respectively, within one epoch.

DESCRIPTION OF THE PREFERRED EMBODIMENTS

An embodiment of the present invention is described below with reference to the accompanying drawings. For facilitating understanding, a description is first given of the management structure of the content, i.e., AV data, stored in a BD-ROM, which is a read-only Blu-ray Disc, defined by the "Blu-ray Disc Read-Only Format Ver1.0 part3 Audio Visual Specifications". The management structure in the BD-ROM is hereinafter referred to as the "BDMV format".

Bit streams coded by an MPEG video or MPEG audio coding method and multiplexed according to the MPEG2 system are referred to as "clip AV streams" (or simply AV streams). Clip AV streams are recorded as a file on a disc by a file system defined in "Blu-ray Disc Read-Only Format part2", which is one of the standards concerning Blu-ray Disc. Such a file is referred to as a "clip AV stream file (or simply AV stream file)".

Clip AV stream files are management units from the viewpoint of the file system, and they are not necessarily easy to understand for users. To enhance the users' convenience, a mechanism for combining a plurality of divided clip AV stream files into one piece of movie content and playing it back or a mechanism for playing back only some of the clip AV stream files should be provided. It is also necessary to record information for facilitating special playback or random access playback operations on a disc as a database. This database is defined by "Blu-ray Disc Read-Only Format part3", which is one of the standards concerning the Blu-ray Disc.

Figure 1:
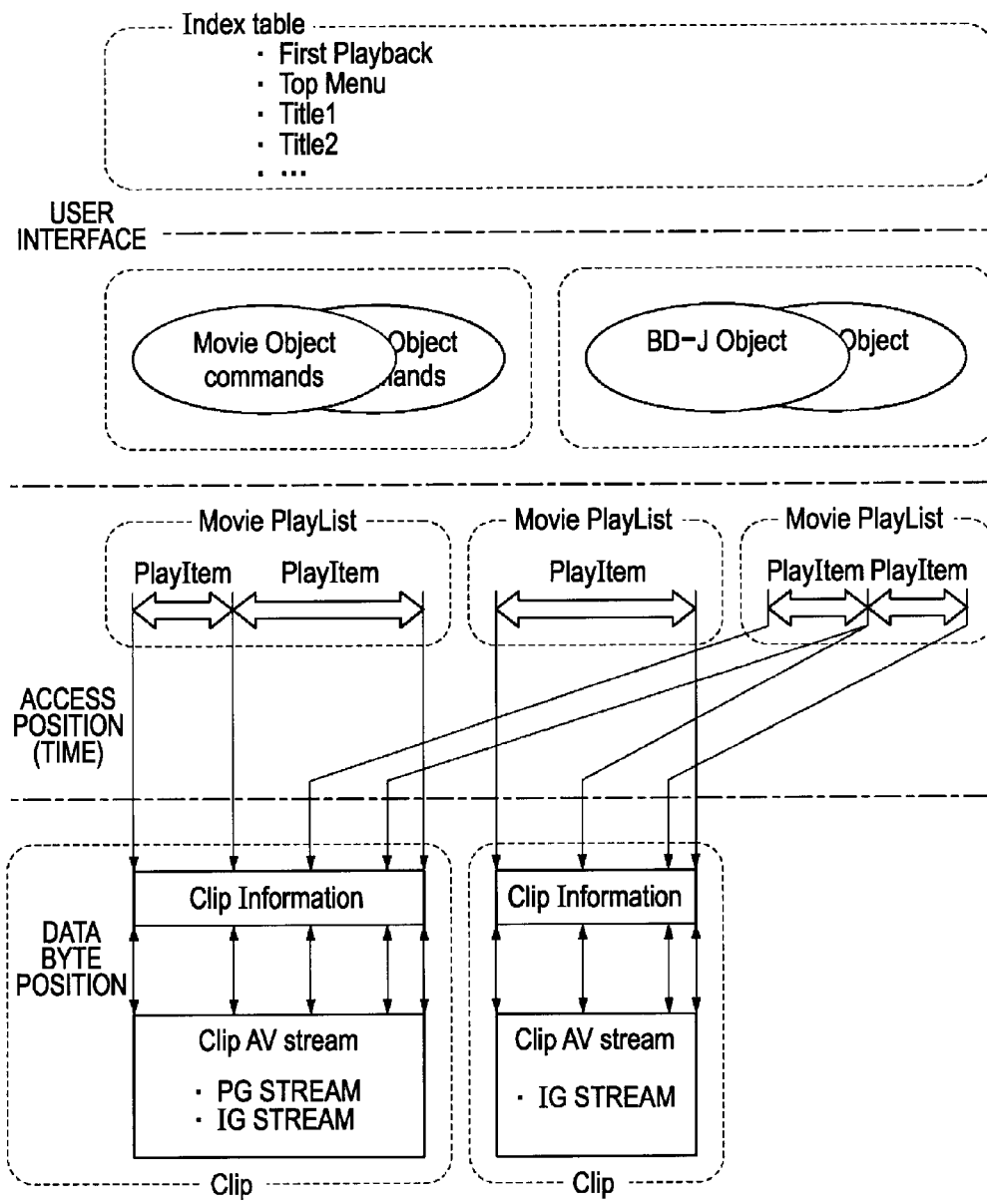
FIG. 1 schematically illustrates a BD-ROM data model.

FIG. 1 schematically illustrates a data model of a BD-ROM. The data structure of the BD-ROM includes, as shown in FIG. 1, four layers. The bottommost layer is a layer in which clip AV streams are disposed (for the sake of convenience, this layer is referred to as the "clip layer"). The second bottommost layer is a layer in which movie playlists and play items that specify playback portions of clip AV streams are disposed (for the sake of convenience, this layer is referred to as the "playlist layer"). The layer higher than the second bottommost layer is a layer in which movie objects including commands that specify the playback order of movie playlists are disposed (for the sake of convenience, this layer is referred to as the "object layer"). The topmost layer is a layer in which an index table that manages titles, etc., stored in this BD-ROM is disposed (for the sake of convenience, this layer is referred to as the "index layer").

Details of the clip layer are given below. A clip AV stream is a bitstream in which video data and audio data are multiplexed in the form of an MPEG2 TS. Information concerning the clip AV streams is recorded in a file as clip information.

In a clip AV stream, streams for displaying subtitles or a menu that accompanies content data, such as video data and audio data, are also multiplexed. Graphics streams for displaying subtitles are referred to as the "presentation graphics (PG) streams". Streams for displaying menus are referred to as the "interactive graphics (IG) streams".

A clip AV stream file and a clip information file in which associated clip information is stored are considered to be a single object, which is referred to as a "clip". That is, a clip is a single object formed of a clip AV stream and clip information.

Generally, a file is treated as a byte string. Content in a clip AV stream file is expanded on the time axis, and the entry point in the clip is mainly designated as the time base. If a time stamp of an access point to a predetermined clip is provided, the corresponding clip information file can be used for finding address information concerning the address at which the reading of data is started in the associated clip AV stream file.

Details of the playlist layer are as follows. A movie playlist is formed of a set of a playback start point (IN point) and a playback end point (OUT point) that specify an AV stream file to be played back and also designate a playback portion of the specified AV stream file. Information concerning one playback start point and one playback end point is referred to as a "play item" (PlayItem). A movie playlist is formed of a set of play items. Playing back a play item is playing back part of the AV stream file which is referred to by the play item. That is, on the basis of information concerning the IN point and the OUT point in a play item, the corresponding zone in a clip is played back.

Details of the object layer are as follows. A movie object includes terminal information for associating a HDMV navigation command program (HDM program) with the movie object. The HDMV program is a command for controlling the playback of a playlist. The terminal information includes information for allowing a user to perform interactive operations on a BD-ROM player. Based on this terminal information, user operations, such as displaying a menu screen or title search, are controlled.

A BD-J object is a Java™ program object. The BD-J object is not directly related to this invention, and a detailed explanation is thus omitted.

Details of the index layer are given below. The index layer includes an index table. The index table is a top level table that defines the title of the BD-ROM disc. Based on the title information stored in the index table, the playback of the BD-ROM disc is controlled by a module manager in BD-ROM resident system software.

Figure 2:
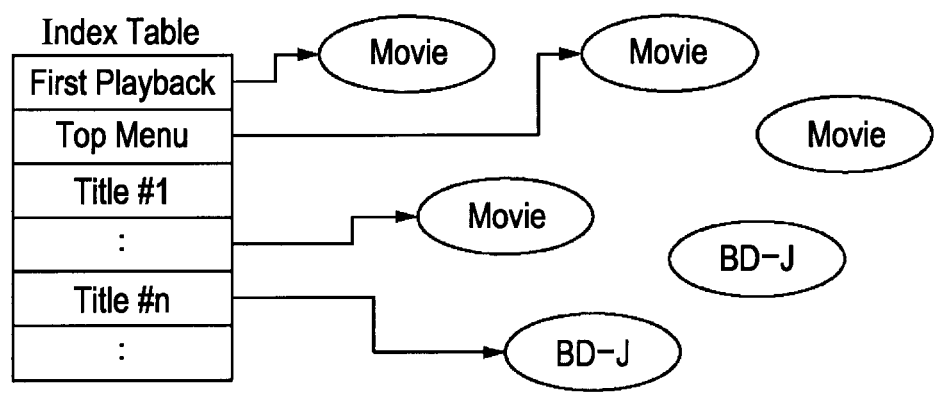
FIG. 2 schematically illustrates an index table.

More specifically, as schematically shown in FIG. 2, an arbitrary entry in the index table is referred to as a "title", and the First Playback, the Top Menu, and Titles #1, #2, and so on, entered in the index tables are all titles. Each title indicates a link to a movie object or a BD-J object. Each title represents one of a HDMV title or a BD-J title.

It is now assumed that the content stored in the BD-ROM disc is a movie. Then, the First Playback is commercial video (trailer) of a movie company which is shown prior to a movie. The Top Menu is a menu screen for selecting the playback of the movie, chapter search, setting of subtitles or languages, playback of special video, etc. The Titles are video selected from the top menu. It is possible that the Titles may be configured as a menu screen.

Figure 3:
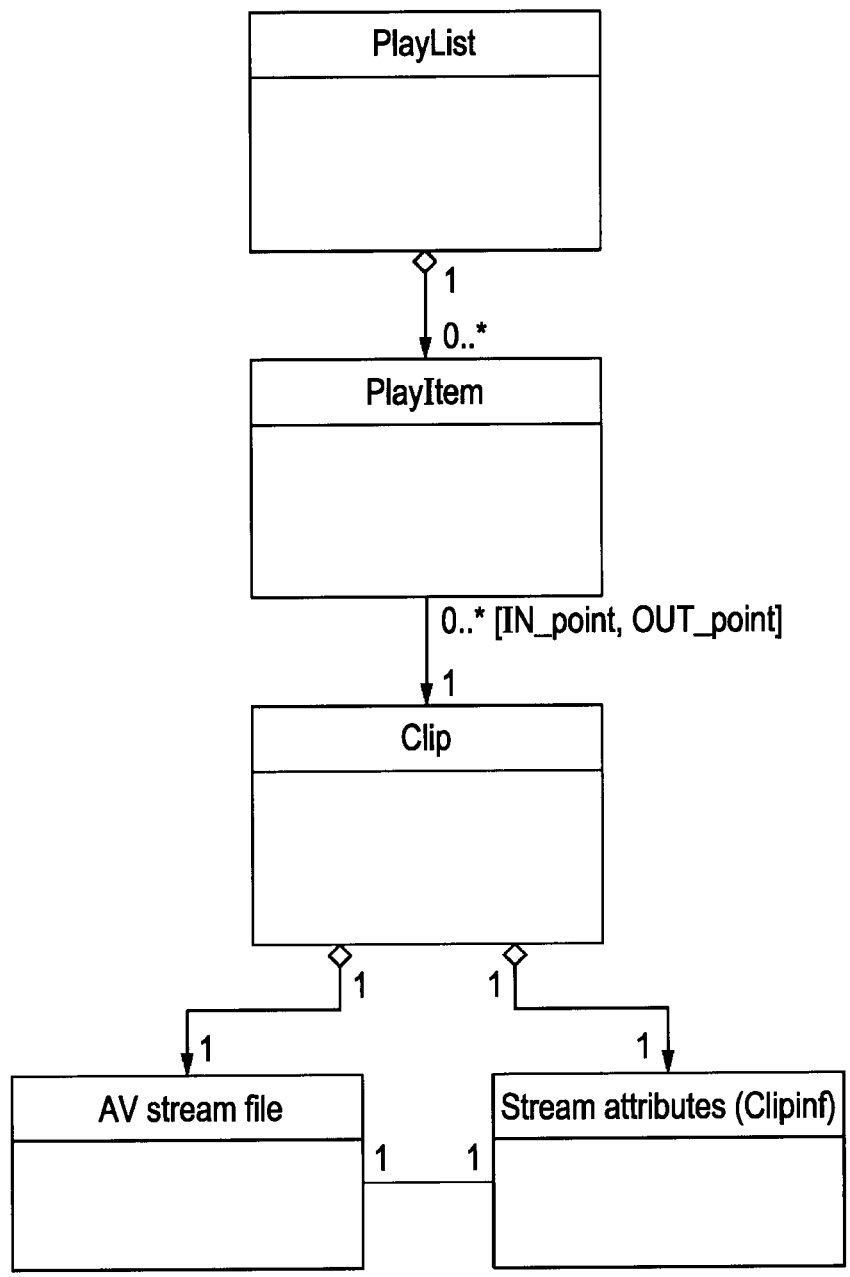
FIG. 3 illustrates a unified modeling language (UML) indicating the relationship among a clip AV stream, clip information, a clip, a play item, and a playlist.

FIG. 3 is a diagram illustrating a unified modeling language (UML) indicating the relationship among the above-described clip AV stream, clip information (Stream Attributes), a clip, a play item, and a playlist. The playlist is associated with one or a plurality of play items, and the play item is associated with one clip. A plurality of play items having different start points and end points can be associated with one clip. One clip AV stream file is referred to by one clip. Similarly, one clip information file is referred to by one clip. A clip AV stream file and a clip information file have a one-on-one correspondence. By the definition of such a structure, the nondestructive playback order for playing back only arbitrary portions can be defined without the need to change the clip AV stream file.

Figure 4:
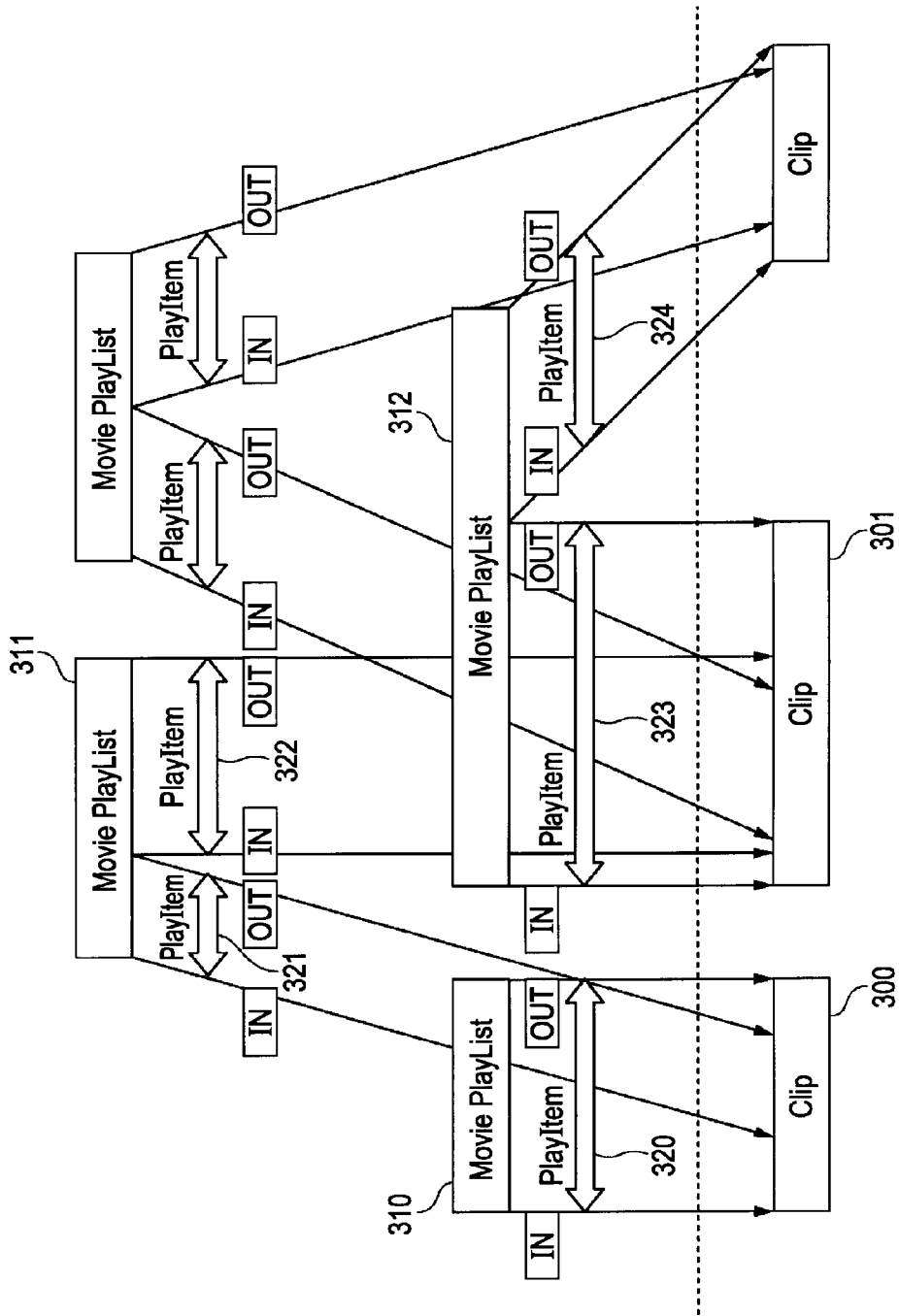
FIG. 4 illustrates a method for referring to the same clip by a plurality of playlists.

As shown in FIG. 4, the same clip can be referred to by a plurality of playlists. Conversely, a plurality of clips can be specified by one playlist. A clip is referred to by the IN point and the OUT point indicated in a play item in a playlist. In the example shown in FIG. 4, a clip 300 is referred to by a play item 320 of a playlist 310, and one zone of the clip 300 is referred to by the IN point and the OUT point of a play item 321 of a playlist 311. One zone of a clip 301 is referred to by the IN point and the OUT point of a play item 322 of the playlist 311, and also, another zone of the clip 301 is referred to by the IN point and the OUT point of a play item 323 of a playlist 312.

Figure 5:
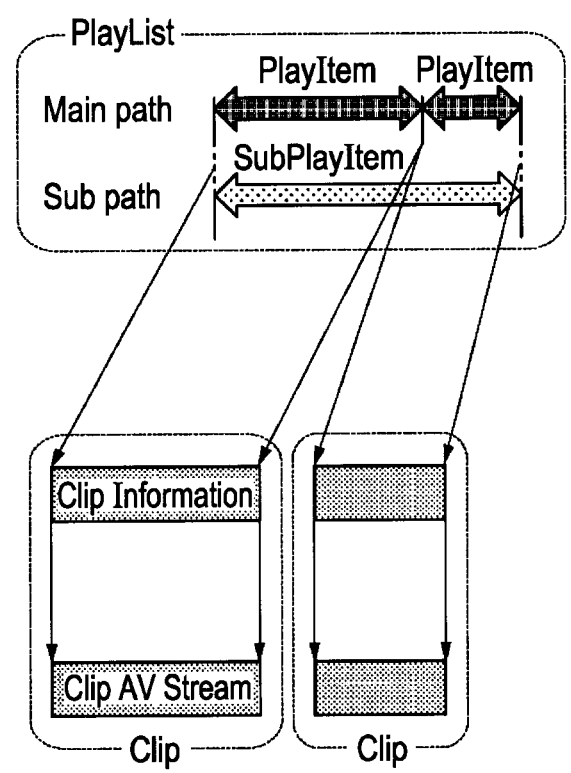
FIG. 5 schematically illustrates a sub-path.

A playlist is, as indicated by an example shown in FIG. 5, includes, not only a main path associated with play items to be played back, but also a sub-path associated with a sub-play item. The sub-play item is, for example, an after-recording (dubbing) play item added to this play item. Only when the playlist satisfies predetermined conditions, can it be provided with a sub-play item, though details are omitted here.

Figure 6:
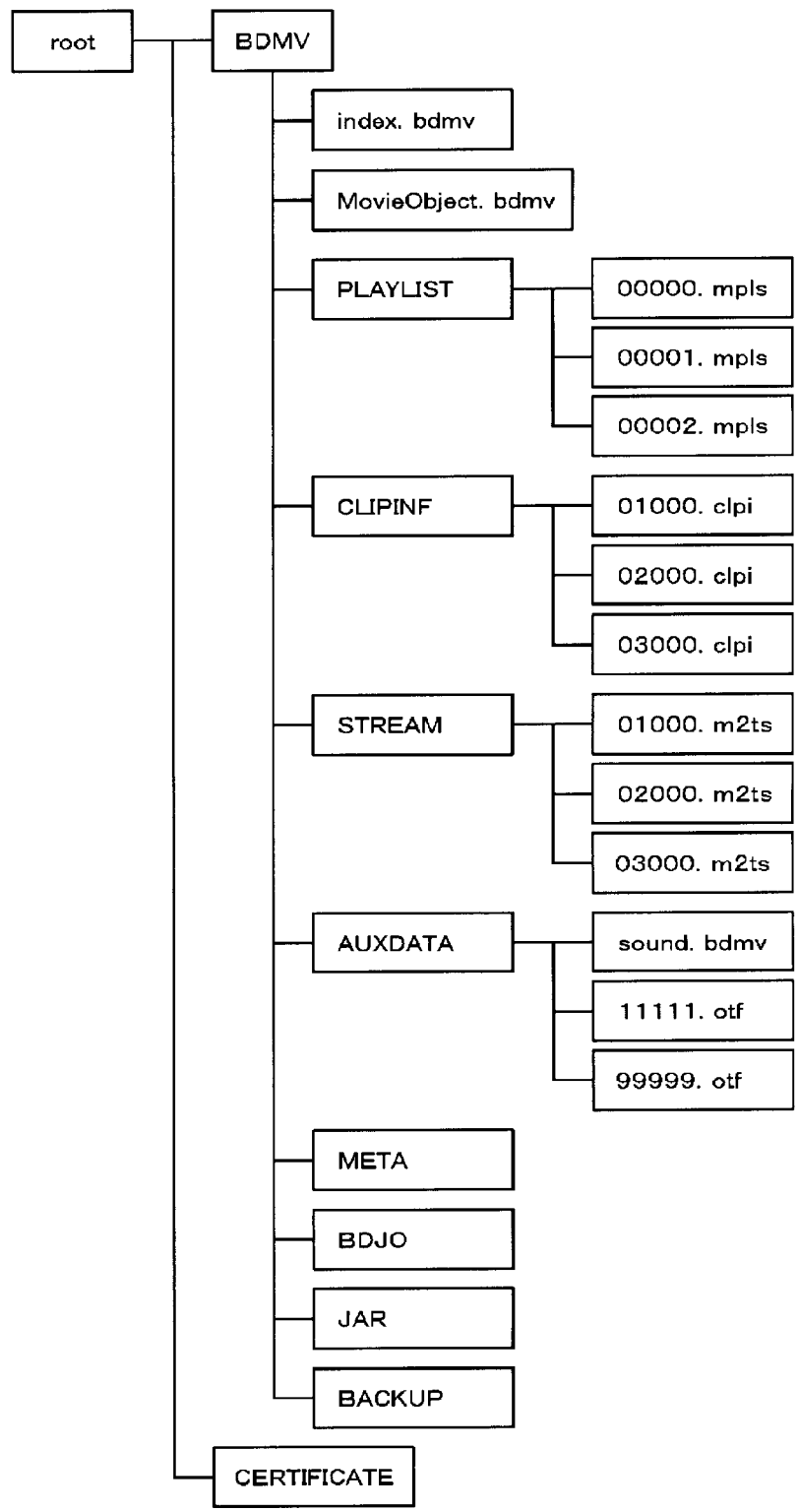
FIG. 6 schematically illustrates a management structure of files recorded on a recording medium.

The management structure of files recorded on a BD-ROM defined by "Blu-ray Disc Read-Only Format part3" is discussed below with reference to FIG. 6. Files are hierarchically managed by the directory structure. First, one directory (root directory in the example shown in FIG. 6) is created on a recording medium. The directories under this directory are managed by one recording/playback system.

Under the root directory, the directory "BDMV" and the directory "CERTIFICATE" are placed. In the directory "CERTIFICATE", information concerning the copyright is stored. In the directory "BDMV", the data structure discussed with reference to FIG. 1 is stored.

Immediately under the directory "BDMV", only two files, i.e., the file "index.bdmv" and the file "MovieObject.bdmv", can be placed. Under the directory "BDMV", the directory "PLAYLIST", the directory "CLIPINF", the directory "STREAM", the directory "AUXDATA", the directory "META", the directory "BDJO", the directory "JAR", and the directory "BACKUP" are placed.

In the file "index.bdmv", the content of the directory "BDMV" is indicated. That is, the file "index.bdmv" corresponds to the index table in the index layer, which is the topmost layer. In the file "MovieObject.bdmv", information concerning at least one movie object is stored. That is, the file "MovieObject.bdmv" corresponds to the above-described object layer.

The directory "PLAYLIST" is a directory in which the database of the playlists is stored. That is, the directory "PLAYLIST" includes files "xxxxx.mpls", which are files concerning the movie playlists. Each file "xxxxx.mpls" is created for the corresponding movie playlist. In the file name, "xxxxx" before "." (period) are five digits, and "mpls" after the period is a fixed extension unique to this type of file.

The directory "CLIPINF" is a directory in which the database of clips is placed. That is, the directory "CLIPINF" includes files "zzzzz.clpi", which are clip information files for the corresponding clip AV stream files. In the file name, "zzzzz" before "." (period) are five digits, and "clpi" after the period is a fixed extension unique to this type of file.

The directory "STREAM" is a directory in which AV stream files, which are real data, are placed. That is, the directory "STREAM" includes clip AV stream files associated with the corresponding clip information files. The clip AV stream files are MPEG2 transport streams (hereinafter referred to as "MPEG2 TSs"), and the file name thereof is "zzzzz.m2ts". In the file name, "zzzzz" before the period is set to be the same as that of the corresponding clip information file. This can contribute to the easy understanding of the relationship between the clip information file and the clip AV stream file.

The directory "AUXDATA" is a directory in which a sound file, a font file, a font index file, a bitmap file", etc., used for displaying menus are placed. In the file "sound.bdmv", sound data related to HDMV interactive graphic stream applications is stored. The file name is fixed to "sound.bdmv". In the file "aaaaa.otf", font data used for subtitle display or BD-J applications is stored. In the file name, "aaaaa" after the period are five digits, and the "otf" after the period is a fixed extension unique to this type of file. The file "bdmv.fontindex" is a font index file.

In the directory "META", a metadata file is stored. In the directory "BDJO" and the directory "JAR", files related to the above-described BD-J objects are stored. In the directory "BACKUP", backup data of the above-described directories and files are stored. The directory "META", the directory "BDJO", the directory "JAR", and the directory "BACKUP" are not directly related to this invention, and an explanation thereof is thus omitted.

When a disc having the above-described data structure is installed in a player, it is necessary that the player first convert the commands indicated in the movie objects read from the disc into unique commands for controlling the hardware of the player. Software for performing such command conversion is stored in a built-in ROM. This software serves as an intermediary between the disc and the player to allow the player to perform operations in accordance with the BD-ROM standards, and is thus referred to as a "BD virtual player".

Figure 7A:
FIGS. 7A and 7B schematically illustrate an operation performed by a BD virtual player.
Figure 7B:
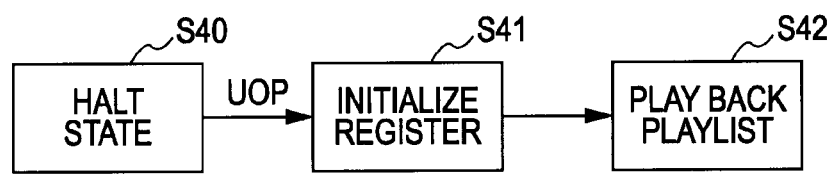

FIGS. 7A and 7B schematically illustrate the operation performed by this BD virtual player. FIG. 7A illustrates an example of the operation performed by the BD virtual player when a disc is loaded. In step S30, a disc is installed in a player and initial access is made to the disc. Then, in step S31, a register that stores common parameters used in the disc is initialized. Then, in step S32, a program is read from the disc and is executed. It should be noted that initial access is to play back a disc for the first time when, for example, the disc is first loaded in the player.

FIG. 7B illustrates an example of the operation performed by the BD virtual player when a user gives an instruction to play back the disc by pressing, for example, a play key. In step S40, the player is in the halt state, and then, the user gives an instruction by the use of, for example, a remote commander (in FIG. 7B, this operation is represented by UOP (user operation)). Then, in step S41, the register storing the common parameters is initialized. In this case, it is not essential that the register be reset. In step S42, the player plays back a playlist (playback phase).

The playback of a playlist by executing a movie object is discussed below with reference to FIG. 8. It is now assumed that an instruction to play back the content of the title number #1 is given through a user operation. In response to the instruction to play back the content, the player refers to the index table shown in FIG. 2 to obtain the object number corresponding to the title number #1. If the object number corresponding to the title number #1 is #1, the player starts executing the movie object #1.

Figure 8:
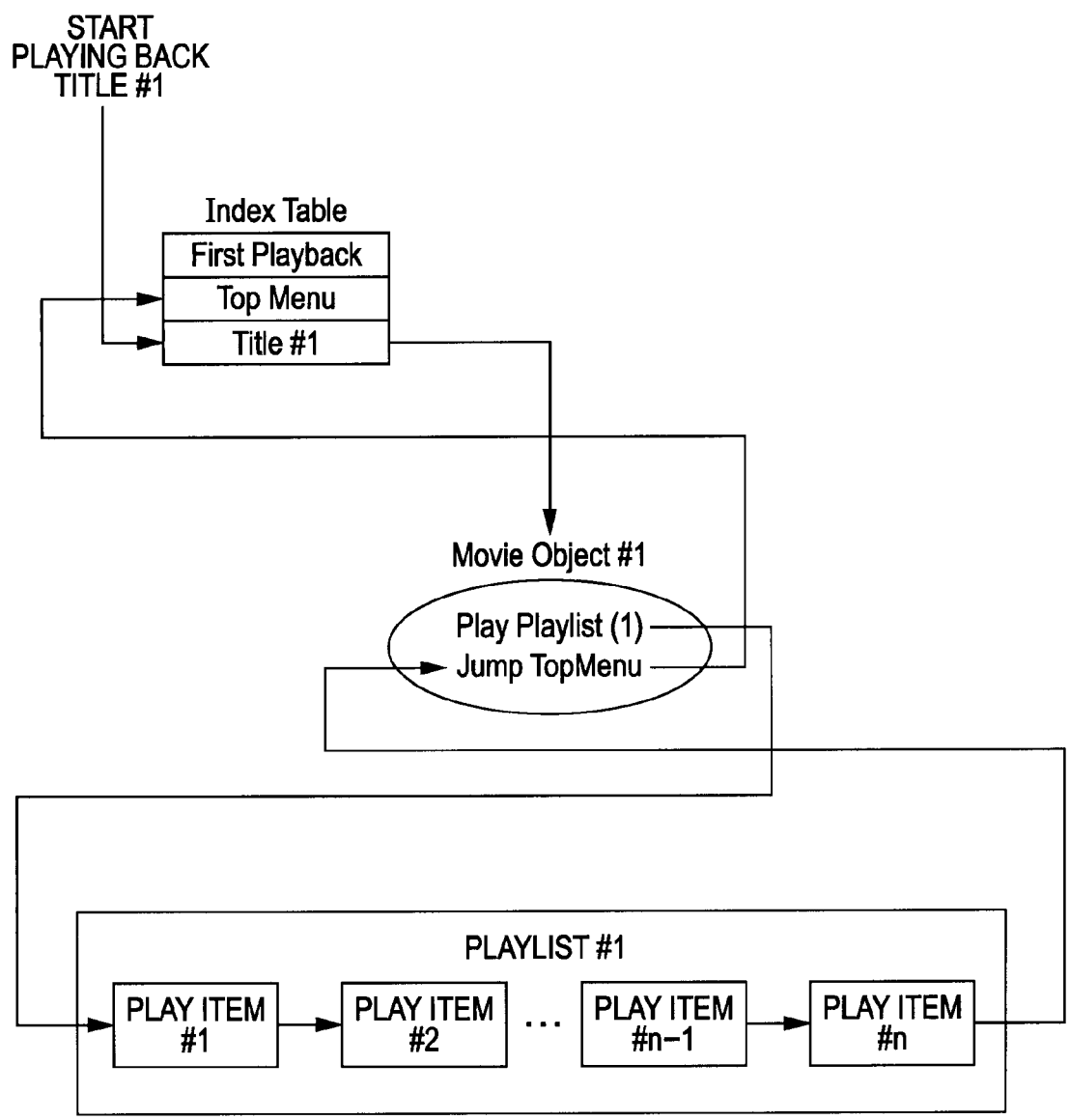
FIG. 8 schematically illustrates an operation performed by a BD virtual player.

In the example shown in FIG. 8, the program in the movie object #1 includes two lines, and the command in the first line indicates "Play PlayList(1)". Accordingly, the player starts playing back the playlist #1. The playlist #1 includes at least one play item, and a plurality of play items are sequentially played back. After the playback of the play items in the playlist #1 is completed, the player returns to the activation of the movie object #1 and executes the command in the second line. In the example shown in FIG. 8, the command in the second line indicates "Jump TopMenu", and the player executes this command to start the movie object of the top menu indicated in the index table.

Figures 9, 10:
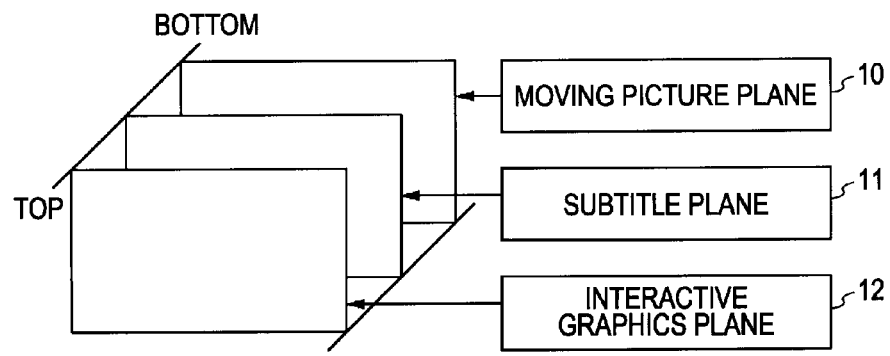
FIG. 9 schematically illustrates an example of a plane structure used as an image display system in an embodiment of the present invention.
FIG. 10 schematically illustrates examples of the resolutions and display colors of a moving picture plane, a subtitle plane, and a graphics plane.

A description is now given of an image display system applicable to this embodiment of the present invention. In this embodiment, the image display system is configured based on planes, as shown in FIG. 9. A moving picture plane 10, which handles images (mainly, moving picture data) specified by the playlist, is displayed on the bottommost (backward) side. A subtitle plane 11, which handles subtitle data to be played back during the playback of the moving picture, is displayed on the top of the moving picture plane 10. An interactive graphics plane 12, which handles graphics data, such as character data for displaying a menu screen and bitmap data for button images, is displayed on the topmost (frontward) side. Those three planes are combined so that one display screen can be displayed.

The moving picture plane 10, the subtitle plane 11, and the interactive graphics plane 12 can be independently displayed. They have resolutions and display colors, such as those shown in FIG. 10. Regarding the moving picture plane 10, the resolution is 1920 (pixel)×1080 (row), and the data length of one pixel is 16 bits. The YCbCr system including the luminance signal Y and the color difference signals Cb and Cr is 4:2:2. The YCbCr (4:2:2) is a color system in which the luminance signal Y and the color difference signals Cb and Cr each have 8 bits per pixel and the color difference signals Cb and Cr for two horizontal pixels form one color data. Concerning the subtitle plane 11 and the interactive graphics plane 12, the resolution is 1920 (pixel)×1080 (row) and the sampling depth of each pixel is 8 bits. As the color system, an 8-bit color map address using a 256-color palette is employed.

In the subtitle plane 11 and the interactive graphics plane 12, 256-level alpha-blending can be implemented. When combining the subtitle plane 11 or the interactive graphics plane 12 with another plane, the opacity can be set in 256 levels. The opacity can be set for each pixel. The opacity $\alpha$ is hereinafter represented by ($0 \leq \alpha \leq 1$). When the opacity $\alpha=0$, the subtitle plane 11 or the interactive graphics plane 12 is completely transparent. When the opacity $\alpha=1$, the subtitle plane 11 or the interactive graphics plane 12 is completely opaque.

The subtitle plane 11 handles portable network graphics (PNG) image data. The interactive graphics plane 12 can also handle PNG image data. The sampling depth of the PNG format ranges from 1 to 16 bits per pixel. When the sampling depth is 8 bits or 16 bits, the alpha channel, i.e., the opaque information (hereinafter also referred to as the "alpha data") concerning the opacity of each pixel can be added. When the sampling depth is 8 bits, the opacity can be specified in 256 levels. Alpha blending can be performed by the use of the opacity information (alpha channel). A 256-color palette image can be used, and the color number (index) of the palette, which is provided in advance, can be specified by the index number.

The image data handled in the subtitle plane 11 or the interactive graphics plane 12 is not restricted to the PNG format. Image data compressed by another compression-coding method, such as Joint Photographic Experts Group (JPEG), run-length-compressed image data, uncompressed bitmap image data, may be handled.

Figure 11:
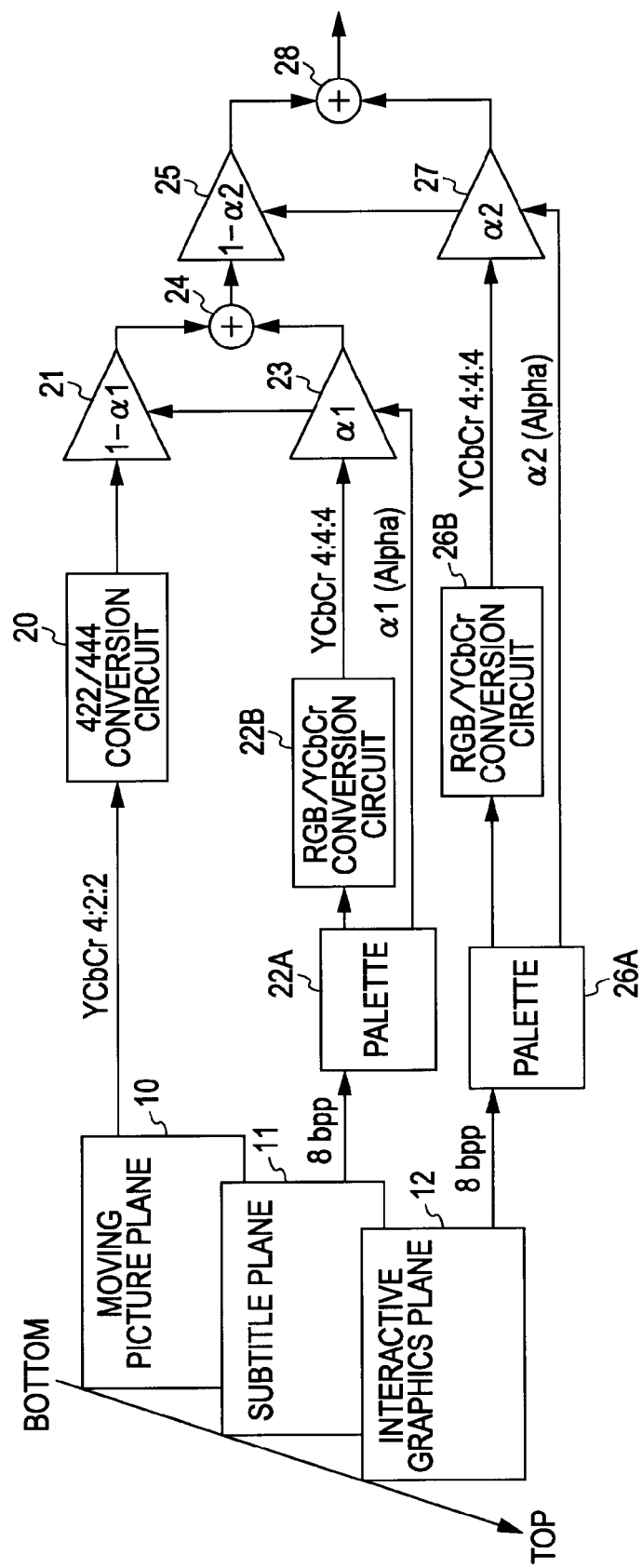
FIG. 11 is a block diagram illustrating the configuration of a graphics processor that combines a moving picture plane, a subtitle plane, and a graphics plane.

FIG. 11 illustrates the configuration of an example of a graphics processor that combines the three planes in accordance with the display system shown in FIG. 9 and the resolution and the display colors shown in FIG. 10. Moving picture data of the moving picture plane 10 is supplied to a 422/444 conversion circuit 20. In the 422/444 conversion circuit 20, the color system of the moving picture data is converted from YCbCr (4:2:2) into YCbCr (4:4:4), and the converted data is then input into a multiplier 21.

Image data of the subtitle plane 11 is input into a palette 22A, and is output as RGB (4:4:4) image data. If the opacity is specified for the image data by means of alpha blending, the specified opacity α1 (0≤α≤1) is output from the palette 22A.

FIG. 12 illustrates an example of input/output data of the palette 22A. In the palette 22A, palette information corresponding to, for example, a PNG file, is stored as a table. The palette 22A refers to the index number by the use of the input 8-bit pixel data as the address. Based on this index number, the palette 22A outputs RGB (4:4:4) data, each color having 8 bits. Simultaneously, the alpha channel data α indicating the opacity is also output from the palette 22A.

FIG. 13 illustrates an example of the palette table stored in the palette 22A. The three primary colors R, G, and B, each having 8 bits, and the opacity α are assigned to each of the 256 color index values [0x00] through [0xFF] ([0x] indicates hexadecimal notation). The palette 22A refers to the palette table on the basis of the input PNG image data, and outputs, for each pixel, the RGB data, each having 8 bits, and the opacity α corresponding to the index value specified by the image data.

The RGB data output from the palette 22A is supplied to an RGB/YCbCr conversion circuit 22B. In the RGB/YCbCr conversion circuit 22B, the RGB data is converted into data represented by the luminance signal Y and the color difference signals Cb and Cr (such data is collectively referred to as the "YCbCr data"), the data length of each signal having 8 bits. The reason for this conversion is to combine planes by the use of the common data format, i.e., YCbCr data, which is the data format of moving picture data.

The YCbCr data and the opacity data α1 output from the RGB/YCbCr conversion circuit 22B are input into a multiplier 23. In the multiplier 23, the input YCbCr data is multiplied by the opacity data α1. The multiplication result is input into one input terminal of an adder 24. In the multiplier 23, each of the luminance signal Y and the color difference signals Cb and Cr is multiplied by the opacity data α1. The complement (1-α1) of the opacity data α1 is supplied to the multiplier 21.

In the multiplier 21, the moving picture data input from the 422/444 conversion circuit 20 is multiplied by the complement (1-α1) of the opacity data α1. The multiplication result is input into the other input terminal of the adder 24. In the adder 24, the multiplication results of the multipliers 21 and 23 are added. Then, the moving picture plane 10 and the subtitle plane 11 are combined. The multiplication result of the adder 24 is input into a multiplier 25.

Image data of the interactive graphics plane 12 is input into a palette 26A and is output as RGB (4:4:4) image data. If the opacity is specified for this image data by means of the alpha blending, the specified opacity α2 (0≤α≤1) is output from the palette 26A. The RGB data output from the palette 26A is supplied to an RGB/YCbCr conversion circuit 26B and is converted into YCbCr data, which is unified into the data format of the moving picture data. The YCbCr data output from the RGB/YCbCr conversion circuit 26B is input into a multiplier 27.

If the image data of the interactive graphics plane 12 is the PNG format, the opacity α2 (≤α≤1) can be set for each pixel. The opacity data α2 is supplied to the multiplier 27. In the multiplier 27, each of the luminance signal Y and the color difference signals Cb and Cr of the YCbCr data input from the YCbCr conversion circuit 26B is multiplied by the opacity data α2. The multiplication result of the multiplier 27 is input into one input terminal of an adder 28. The complement (1-α2) of the opacity data α2 is supplied to the multiplier 25.

In the multiplier 25, the addition result of the adder 24 is multiplied by the complement (1-α2) of the opacity data α2. The multiplication result of the multiplier 25 is input into the other input terminal of the adder 28, and is added to the multiplication result of the multiplier 27. Then, the interactive graphics plane 12 is combined with the composite image of the moving picture plane 10 and the subtitle plane 11.

In the subtitle plane 11 or the interactive graphics plane 12, the opacity α of an area without images is set to be 0 so that a plane displayed under the subtitle plane 11 or the interactive graphics plane 12 can be seen through the plane 11 or 12. For example, the moving picture data displayed on the moving picture plane 11 can be displayed as a background of the subtitle plane 11 or the interactive graphics plane 12.

The configuration of the graphics processor shown in FIG. 11 may be implemented by either of hardware or software.

Figure 14:
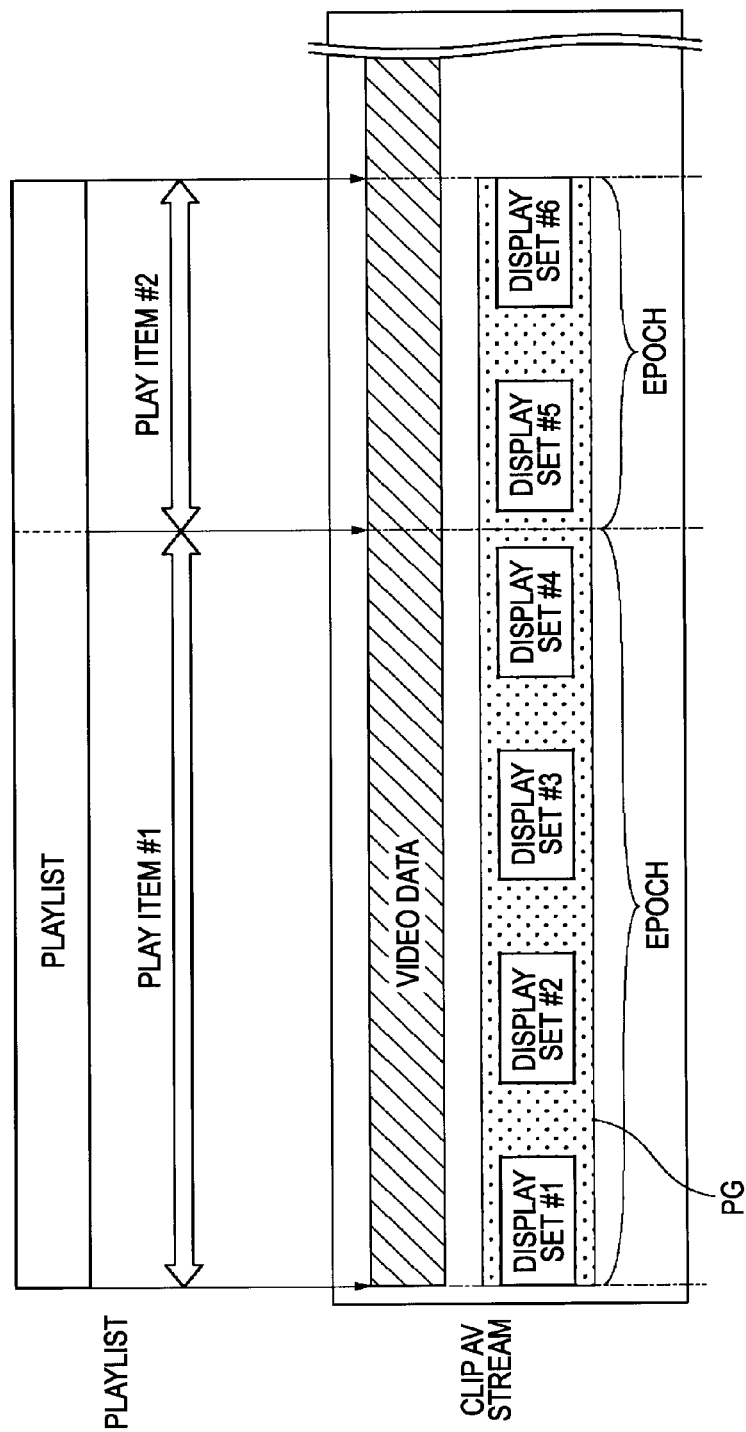
FIG. 14 schematically illustrates a presentation graphics (PG) stream.

A description is given of a presentation graphics (PG) stream and an interactive graphics (IG) stream with reference to FIG. 14. As stated above, a PG stream is a stream including subtitle image data for displaying subtitles. More specifically, the PG stream includes subtitle image data itself formed of bitmap data and data indicating how to display the subtitle image data. The IG stream is a stream including data used for displaying menus, and more specifically, button image data used for a menu screen, data indicating how to display the button image data, and commands instructed by the buttons.

The PG stream or the IG stream is included in a clip AV stream and is formed in units of epochs including one or a plurality of display sets. The display set and the epoch can be regarded as a picture and a group of pictures (GOP), respectively, which are defined in MPEG2.

That is, the display set is the minimum unit for displaying subtitles and corresponds to one subtitle image. One epoch is formed of one or a plurality of display sets. Generally, epochs are formed in units of play items. That is, an epoch is formed of display sets for displaying subtitles to be displayed during the playback of a certain play item. A PG decoder for decoding PG streams clears the subtitle plane 11 and various buffers in units of epochs.

In the case of a PG stream, as shown in FIG. 14, a plurality of display sets can be included in one epoch. In contrast, in the case of an IG stream, if the IG stream is a pre-load IG stream, only one display set is included in one epoch.

Practically, the base unit for forming epochs is not restricted to play items, and a desired item to form epochs may be determined by an authoring side. In the case of a PG stream, an epoch can be formed of a plurality of display sets for displaying a plurality of subtitle sets forming a dialog in a movie. Alternatively, a dialog may be separated by words, and an epoch may be formed of a plurality of display sets for displaying the corresponding words.

Figure 15A:
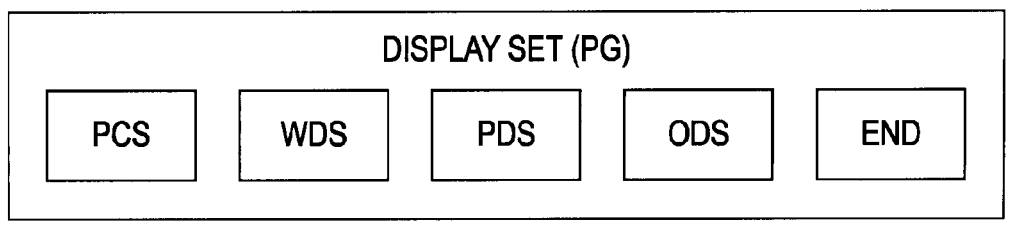
FIGS. 15A and 15B illustrate the configurations of display sets.
Figure 15B:
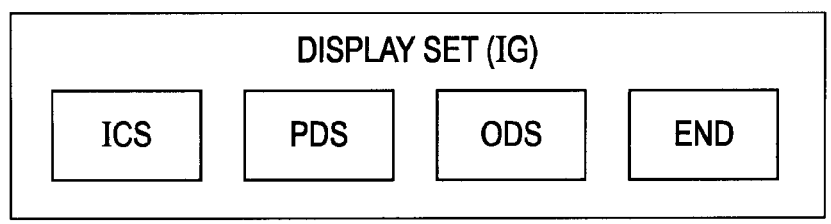

FIGS. 15A and 15B schematically illustrate the configuration of display sets. The display set of a PG stream includes, as shown in FIG. 15A, five segments, such as a presentation composite segment (PCS), a window definition segment (WDS), a palette definition segment (PDS), an object definition segment (ODS), and an END segment. Each segment is briefly described below, though details thereof are not discussed here. In the PCS, basic information concerning the subtitles is stored. The WDS defines a display frame, which is referred to as the "window", for displaying the subtitles. The WDS is fixed in the epoch. The PDS defines color information concerning the subtitles and includes, for example, an indexed color information table. The ODS includes configuration information concerning the subtitles. For example, bitmap data for displaying the subtitles is compression-coded by a predetermined compression coding method, such as run-length compression coding. The END segment is a segment indicating the end of this display set.

The display set of an IG stream includes, as shown in FIG. 15B, four segments, i.e., an interactive composition segment (ICS), a PDS, an ODS, and an END segment. Among the four segments, the ICS is a segment for storing the basic structure of the IG stream. The PDS, OSD, and END segment are similar to those of the PG stream. That is, the PDS is a segment for storing color information concerning button images. The ODS is information for storing the configuration of button images. More specifically, in the ODS, a button image itself, e.g., bitmap data for displaying a button image, is compression-coded by a predetermined compression-coding method, such as run-length compression, and stored. The END segment is a segment indicating the end of this display set.

Figure 16:
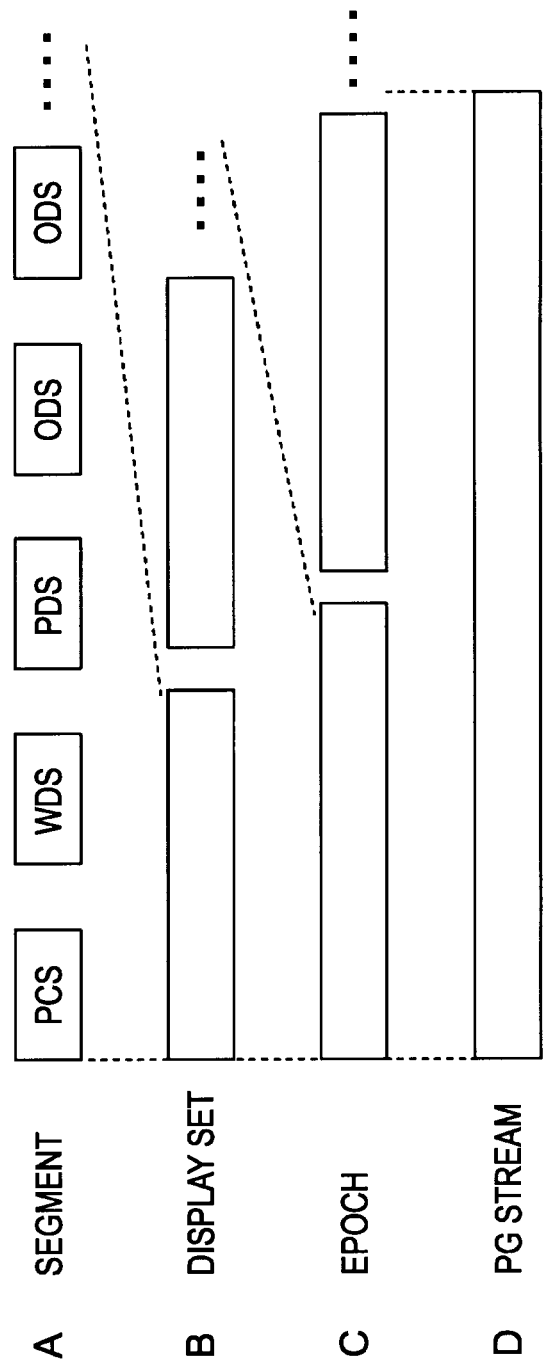
FIG. 16 schematically illustrates a logical structure of a display set of a PG stream.

FIG. 16 schematically illustrates the logical structure of display sets of a PG stream. A set of four segments, such as a PCS, a WDS, a PDS, an ODS, and an END segment (not shown), forms one display set, as indicated by part A and part B of FIG. 16. The only one PCS may always be stored in a display set. The only one WDS may almost always be stored in a display set. If, however, the flag palette_up_date_flag, which is discussed below, defined in the PCS, indicates 1, the WDS is optional. The PDS and ODS are optional and it is not necessary that they are contained in a display set.

As indicated by part C of FIG. 16, an epoch is formed of one or a plurality of display sets. Although details are not discussed here, an epoch start display set can be defined in the field composition_state contained in the block composition_descriptor( ) of the PCS. The epoch is defined on the basis of this epoch start display set. For example, the epoch can be defined as a group of display sets starting from the display set in which an epoch start display set is defined in the PCS until the display set one before the display set in which the subsequent epoch start display set is defined in the PCS. A specific example of the definition of the epoch is discussed below. As indicated by part D of FIG. 16, a PG stream includes one or a plurality of epochs.

Figure 17:
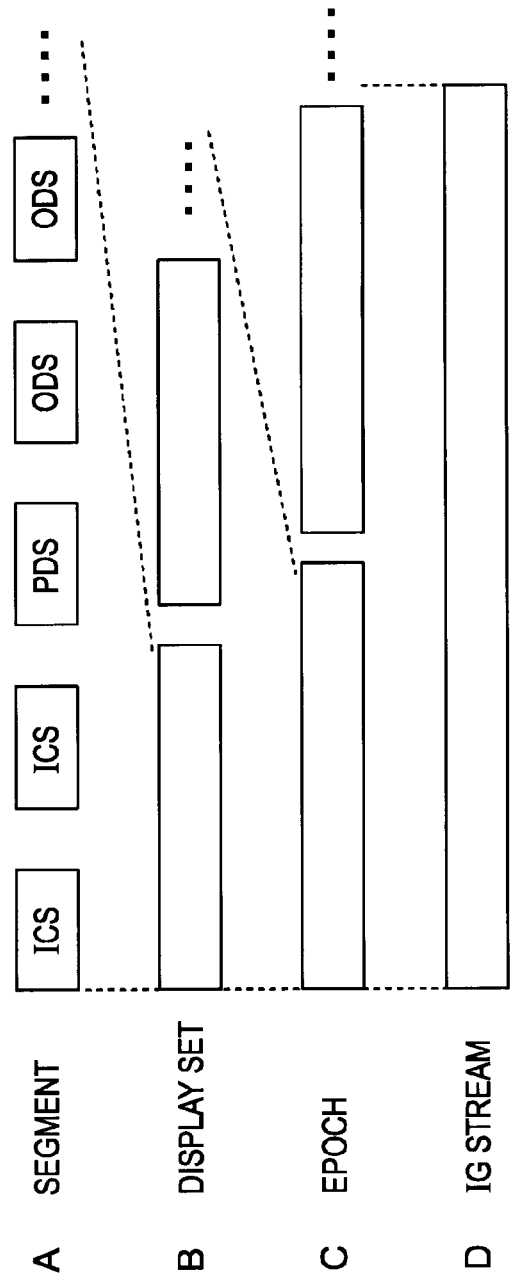
FIG. 17 schematically illustrates a logical structure of a display set of an IG stream.

FIG. 17 schematically illustrates the logical structure of display sets of an IG stream. As indicated by part A of FIG. 17, the overall hierarchical structure of the display set of the interactive graphics is the same as that of a PG stream, except for the configuration of the segments. In the display set of the IG stream, as well as that of the PG stream, the epoch is defined on the basis of the epoch start display set defined by the field composition_state contained in the block composition_descriptor( ) of the ICS. As in the PG stream, the PDS and ODS are optional and it is not necessary that they are contained in the display set. Concerning the display set of the IG stream, a detailed description is omitted for simple representation.

Figure 18:
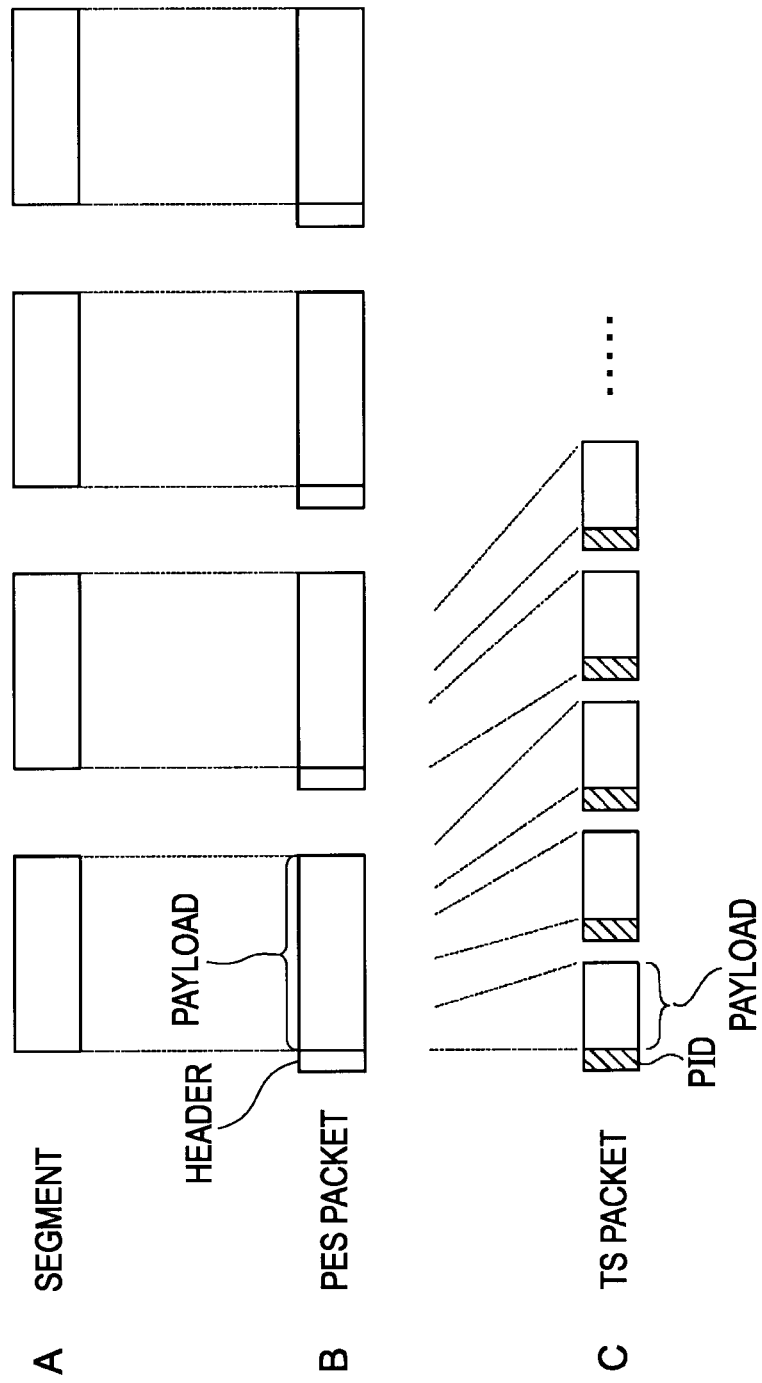
FIG. 18 schematically illustrates a storage format of a display set.

FIG. 18 illustrates the storage format of an example of the above-described display sets. As stated above, a display set for displaying subtitles and a display set for displaying a button image are multiplexed with a clip AV stream as a PG stream and an IG stream, respectively. The display set is formed of a plurality of segments, as indicated by part A of FIG. 18.

As indicated by part B of FIG. 18, the plurality of segments forming the display set are distinguished from each other by the header information, and are stored in the payloads of packetized elementary stream (PES) packets. The maximum size of each PES packet is fixed to 64 kilobytes (KB). If one ODS or ICS, which has a relatively large amount, exceeds the maximum size, it is divided into smaller portions, and the divided portions are then filled in the payloads of a plurality of PES packets. On the other hand, since a PCS, WDS, and PDS are less than 64 KB in most cases, one segment can be stored in a PES packet. In each PES packet, information indicating the type of data stored in the payload, i.e., PCS, WDS, PDS, or ODS (in the case of a PG stream), or identification information indicating the order of packets, is stored in the PES header.

In the PES header, the DTS (decoding time stamp) that specifies the decoding time of this PES packet and the presentation time stamp (PTS) that specifies the output time of the decoded data are also stored. That is, when the system time clock (STC) set in a reference decoder defined by the MPEG systems coincides with the DTS, the decoding of the data stored in the payload of the PES packet is started. When the STC coincides with the PTS, the decoded data is output.

The PTS and DTS are optional, and if the first segment portion of a predetermined access unit is contained in the payload of the PES packet, the PTS and DTS are added to the PES header. For example, if one segment is divided and stored in a plurality of PES packets, the PTS and DTS are stored only in the PES packet in which the first segment portion is stored.

Each PES packet is further divided into smaller portions and are stored in transport stream (TS) packets forming an MPEG TS, as indicated by part C of FIG. 18. The order of TS packets and identification information for identifying the data stored in each TS packet are stored in the packet identification (PID).

Details of the segments that are directly related to the present invention are specifically given below. The PCS and WDS contained in a display set of a PG stream are first discussed. FIG. 19 illustrates the syntax representing an example of the structure of a PCS. The syntax shown in FIG. 19 is represented in C language notation, which is one of the description languages for computer programs. The syntaxes shown in other drawings are also represented in C language notation.

The block segment_descriptor( ) includes the field segment_type and the field segment_length (not shown). The field segment_type designates the type of segment. If the value of the field segment_type indicates 0x16, it means that this segment is a PCS. 0x indicates hexadecimal notation. The field segment_length represents the length of this segment starting from the segment_length.

The block video_descriptor( ) includes the field video_width, the field video_height, and the field frame_rate (not shown). The field video_width and the field video_height represent the frame of the moving picture to be played back simultaneously with the subtitles to be displayed by the display set containing this PCS. The field frame_rate designates the frame rate of the moving picture.

The block composition_descriptor( ) includes the field composition_number and the field composition_state (not shown). The field composition_number indicates the order of this segment in the epoch associated with this PCS. The field composition_state indicates the type of display set containing this PCS.

The types of display sets are briefly discussed below. There are four types of display sets, i.e., the epoch start display set, epoch continue display set, acquisition point display set, and normal case display set.

The epoch start display set is the first display set of an epoch. The epoch continue display set is used when an epoch is associated with more than one play item. For example, if an epoch is associated with the play item #1 and the next play item #2, the epoch continue display set is set in the head of the play item #2.

The acquisition point display set is concerned with the decoding of subtitles, and represents a safe decoding start point. That is, when random access is made in a player, it is highly likely that the access destination is a midpoint of an epoch. Then, after the random access, the player restarts decoding to display the subtitles at the position of an acquisition point display set.

The normal case display set is concerned with the decoding of subtitles, and represents an unsafe decoding start point. If it is desired that the color or configuration of the subtitles which are currently displayed by another display set be changed, a display set indicating the change is set in a normal case display set. If the player finds a normal case display set during the decoding and playback of the subtitles, it changes the color or configuration of the currently displayed subtitles in accordance with the change.

Referring back to a description of the syntax of the PCS, the field palette_update_flag is a flag indicating whether the palette is updated. The field palette_id_ref indicates the ID of the palette, which is referred to by one frame of subtitles displayed by this display set. That is, the color information in the PDS in the PG stream is referred to by this field palette_id_ref.

The field number_of_composition_objects indicates the number of objects contained in one frame including the subtitles displayed by this display set. The loop represented by the subsequent FOR statement is repeated for the same number as that indicated by the field number_of_composition_objects. Each object displayed by this display set is defined by the block composition_object( ).

FIG. 20 illustrates the syntax representing the structure of an example of the block composition_object( ). The field object_id_ref indicates a reference to the ODS used for displaying the subtitles by the block composition_object( ). The field window_id_ref designates the ID of the window in which the object used for displaying the subtitles by this block composition_object( ) is displayed.

The field object_cropped_flag is a flag indicating whether the object used for displaying the subtitles by this block composition_object( ) is to be cropped. That is, a predetermined size of the subtitles can be cropped from the ODS. If the flag object_cropped_flag indicates that the object is to be cropped, part of the subtitles can be cropped on the basis of clop size information, which is discussed below, and the cropped portion is displayed.

The field forced_on_flag indicates whether the subtitles by this block composition_object( ) are forcefully displayed regardless of an instruction indicating whether to display subtitles given by a user operation.

The field composition_object_horizontal_position and the field composition_object_vertical_position indicate the horizontal position and the vertical position, respectively, of the subtitles displayed on the screen by this block composition_object( ). The horizontal position and the vertical position are indicated by the relative positions with respect to the window position represented by a WDS, which is discussed below.

If the flag represented by the above-described field object_cropped_flag indicates that the object is to be cropped, the subsequent IF statement (if(object_cropped_flag==1b)) is provided so that the position and size of a portion to be cropped are specified. That is, the horizontal position and the vertical position of the origin of the portion to be cropped are indicated by the field object_cropping_horizontal_position and the field object_cropping_vertical_position, respectively, in the block cropping_rectangle( ). The width and the height of the portion to be cropped are indicated by the field object_cropping_width and the field object_cropping_height, respectively.

FIG. 21 illustrates the syntax representing the structure of an example of the WDS. The block segment_descriptor( ) includes the field segment_type and the field segment_length (not shown). The field segment_type indicates the type of segment. If the value of the segment_type indicates 0x17, it means that the type of segment is a WDS. The field segment_length represents the length of this segment starting from this field segment_length.

The field number_of_windows indicates the number of windows contained in one frame including the subtitles displayed by the display set containing this WDS. The loop represented by the subsequent FOR statement is repeated for the same number as that indicated by the field number_of_windows, and each window is defined by the block window( ).

FIG. 22 illustrates the syntax representing the structure of an example of the block window( ). The field window_id designates the ID of this window. The field window_horizontal_position and the field window_vertical_position indicate the horizontal position and the vertical position, respectively, of the origin of this window frame. The field window_width and the field window_height indicate the width and the height, respectively, of this window.

A description is now given of the ICS contained in a display set of an IG stream. Prior to a description of the ICS, a menu screen and a button configuration are briefly discussed below with reference to FIG. 23. A menu screen 301 on which a plurality of buttons 300 are displayed, as indicated by part A of FIG. 23, is now considered.

The menu screen 301 is hierarchically constructed, as indicated by part B of FIG. 23, of a plurality of menu frames. If a certain button 300 in the menu frame located at the topmost front is shifted from the selected state to the activated state by means of a predetermined input unit, the menu frame located immediately at the back of the menu frame with the operated button 300 may appear at the topmost front. Hereinafter, changing the state of a button by means of a predetermined input unit is simply referred to as "operating a button".

One button 300 displayed on the menu screen 301 may be hierarchically constructed of a plurality of buttons 302A, 302B, 302C, and so on, as indicated by part C and part D of FIG. 23. In other words, a plurality of buttons can be displayed at a single display position and one of the buttons can be selected. For example, if one of the plurality of buttons is operated, the functions and display of other buttons located at the same position can also be simultaneously changed. This is convenient because it is not necessary to change the menu screen 301. A set of a plurality of buttons that can be selectively displayed on the same position is referred to as a "button overlap group (BOG).

Each of the buttons forming the BOG may be provided with three states, such as the normal state, the selected state, and the activated state. As indicated by part E of FIG. 23, buttons 303A, 303B, and 303C representing the normal state, the selected state, and the activated state, respectively, can be provided for each button forming the BOG. As indicated by part F of FIG. 23, animated pictures can also be provided for each of the buttons 303A, 303B, and 303C representing the three states. In this case, a button having animated pictures includes the same number of button images as the number of animated pictures.

A plurality of button images forming animated pictures are hereinafter also referred to as "animated frames".

FIG. 24 illustrates the syntax representing the structure of an example of header information of an ICS. The header of the ICS includes the block segment_descriptor( ), the block video_descriptor( ), the block composition_descriptor( ), the block sequence_descriptor( ), and the block interactive_composition_data_fragment( ). The block segment_descriptor( ) indicates that this segment is an ICS. The block video_descriptor( ) indicates the frame rate and frame size displayed together with this menu. The block composition_descriptor( ) includes the field composition_state (not shown), and represents the status of this ICS. The block sequence_descriptor( ) indicates whether this ICS is associated with a plurality of PES packets.

More specifically, the block sequence_descriptor( ) indicates whether the ICS contained in the current PES packet is the first ICS or the final ICS of a single IG stream.

As stated above, the maximum data size of a PES packet is 64 KB. If the data size of a single ICS exceeds 64 KB, the ICS is divided into small portions and they are filled into PES packets. In this case, it is necessary that the header shown in FIG. 24 be contained only in the first PES packet and the final PES packet among the PES packets containing the divided portions of the ICS, and the header can be omitted in the other PES packets. If the block sequence_descriptor( ) indicates that the ICS contained in the current PES packet is the first ICS and the final ICS, it means that the ICS is contained in a single PES packet.

FIG. 25 illustrates the syntax representing the structure of an example of the block interactive_composition_data_fragment( ). In the example shown in FIG. 25, the block interactive_composition_data_fragment( ) is indicated as the block interactive_composition( ). The field interactive_composition_length has a 24-bit data length, and indicates the length of the block interactive_composition( ) after the field interactive_composition_length. The field stream_model has a 1-bit data length and indicates whether this stream is multiplexed. That is, the IG stream can be multiplexed with an AV stream, or the IG stream itself can form a single clip AV stream.

The field user_interface_model has a 1-bit data length and indicates whether a menu displayed by this stream is a pop-up menu or a regular menu (always displayed on the screen). The display of the pop-up menu can be controlled by turning ON or OFF a predetermined input unit, for example, a button of a remote control commander. On the other hand, it is difficult to control the display of the regular menu by means of a user operation. If the field user_interface_model indicates 0, this menu is a pop-up menu. If the field user_interface model indicates 1, this menu is a regular menu.

If the field user_interface_model indicates 0, the field composition_time_out_pts and the field selection_time_out_pts after the IF statement, i.e., If (stream_model=='$0_b$'), become effective. The field composition_time_out_pts has a 33-bit data length and indicates the time at which this menu display disappears. The field selection_time_out_pts has a 33-bit data length and indicates the time at which a selection operation on this menu becomes ineffective. The time in the field composition_time_out_pts or the field selection_time_out_pts is represented by the PTS defined in the MPEG2.

The field user_time_out_duration has a 24-bit data length and indicates the automatically initializing duration for this menu display. The next field number_of_pages has an 8-bit data length and indicates the number of pages provided for this menu. The initial value of this field is 0. That is, this menu display has a hierarchical structure indicated by part B of FIG. 23, and if a plurality of pages are provided, the field number_of_pages indicates 1 or greater. The loop represented by the next FOR statement is repeated for the same number as that indicated by the field number_of_pages, and then, each page in the menu is defined.

FIG. 26 illustrates the syntax representing the structure of an example of the block page( ). The field page_id has an 8-bit data length and indicates the ID for identifying this page. The field page_version_number has an 8-bit data length and indicates the version number of this page. The next block UO_mask_table( ) designates a table indicating user operations (UO) that are prohibited from being performed on an input unit during the display of this page.

The block in_effects( ) indicates the animation block activated when this page is displayed. In the block effect_sequence( ) in { }, an animation sequence is indicated. The block out_effects( ) indicates the animation block activated when the display of this page is finished. In the block effect_sequence( ) in { }, an animation sequence is indicated. The block in_effects( ) and the block out_effects( ) indicate animation activated when this ICS is found in the case of a change in the pages.

The next field animation_frame_rate_code has an 8-bit data length and indicates a parameter for setting the animation frame rate if the button image of this page is shown as animation. When the frame rate of the video data in the clip AV stream file corresponding to this ICS is indicated by $V_{frm}$, and the animation frame rate is indicated by $A_{frm}$, the field animation_frame_rate_code can be represented by the ratio of $V_{frm}$ to $A_{frm}$, i.e., $V_{frm}/A_{frm}$.

The field default_selected_button_id_ref has a 16-bit data length and indicates the ID of the button to be first selected when this page is displayed. The next field default_activated_button_id_ref has a 16-bit data length and indicates the ID of the button which is automatically activated when the time represented by the field selection_time_out_pts discussed with reference to FIG. 25 has been reached.

The field palette_id_ref has an 8-bit data length and indicates the ID of the palette referred to by this page. That is, the color information in the PDS of the IG stream can be specified by this field palette_id_ref.

The next field number_of_BOGs has an 8-bit data length and indicates the number of BOGs used in this page. The loop represented by the subsequent FOR statement is repeated for the same number as that indicated by the field number_of_BOGs, and then, each BOG is defined by the block button_overlap_group( ).

FIG. 27 illustrates the syntax representing the structure of an example of the block button_overlap_group( ). The field default_valid_button_id_ref has a 16-bit data length and indicates the ID of the button to be first displayed in the BOG defined in the block button_overlap_group( ). The subsequent field number_of_buttons has an 8-bit data length and indicates the number of buttons used in this BOG. The loop of the next FOR statement is repeated for the same number as that indicated by the field number_of_buttons, and then, each button is defined by the block button( ).

That is, as discussed above, a BOG can be provided with a plurality of buttons, and the structure of each button is defined by the block button( ). The button structure defined by this block button( ) is an actual button to be displayed.

FIG. 28 illustrates the syntax representing the structure of an example of the block button( ). The field button_id has a 16-bit data length and indicates the ID for identifying this button. The field button_numeric_select_value has a 16-bit data length and indicates to which numeric key on a remote control commander this button is assigned. The field auto_action_flag has a 1-bit data length and indicates whether the function assigned to this button is automatically executed when this button is selected.

The field button_horizontal_position and the field button_vertical_position each have a 16-bit data length and designate the horizontal position and vertical position (height) of this button on the frame.

The block neighbor_info( ) indicates periphery information concerning this button. That is, the value in the block neighbor_info( ) represents which button is to be selected when a direction key, which can specify the top, bottom, left, or right direction, of a remote control commander is operated while the target button is being selected. In the block neighbor_info( ), the field upper_button_id_ref, the field lower_button_id_ref, the field left_button_id_ref, and the field right_button_id_ref, each having a 16-bit data length, indicate IDs of the buttons to be selected when the direction key specifies the top, bottom, left, and right directions, respectively.

The block normal_state_info( ), the block selected_state_info( ), and the block activated_state_info( ) indicate information concerning the button in the normal state, the selected state, and the activated state, respectively.

The block normal_state_info( ) is discussed first. The field normal_start_object_id_ref and the field normal_end_object_id_ref, each having a 16-bit data length, indicate the IDs for specifying the first object and the final object of animation of the button in the normal state. That is, the field normal_start_object_id_ref and the field normal_end_object_id_ref can specify button images (i.e., animation frames) used for displaying the button animation for the corresponding ODS.

The next flag normal_repeat_flag has a 1-bit data length and indicates whether the button animation is repeated. For example, if the flag normal_repeat_flag indicates 0, the animation is not repeated. If the flag normal_repeat flag indicates 1, the animation is repeated.

The next flag normal_complete_flag has a 1-bit data length and is defined according to an embodiment of the present invention. The flag normal_complete_flag controls the animation operation when the state of the button is changed from the normal state to the selected state.

More specifically, if the flag normal_complete_flag indicates 1, all animation images defined in the normal state are displayed when the state of the button is changed from the normal state to the selected state. More specifically, if the flag normal_complete_flag indicates 1, in response to an instruction to change the state of the button from the normal state to the selected state while animation in the normal state is being displayed, animation frames are displayed starting from the animation frame displayed upon receiving this instruction to the animation frame indicated by the field normal_end_object_id_ref.

If the flag normal_complete_flag indicates 1 and if the flag normal_repeat_flag indicates 1, which means that animation is repeated, animation frames are displayed starting from the animation frame displayed upon receiving this instruction to the animation frame indicated by the field normal_end_object_id_ref.

In this case, even if the button is in the unselected state or the button image itself is turned OFF while animation is being displayed, the animation can continue to be displayed until the animation frame indicated by the field normal_end_object_id_ref, and then, the state of the button is changed.

The button is in the unselected state in a case where, for example, the selection of the button has become ineffective by the definition of the field selection_time_out_pts, or the menu is automatically initialized by the definition of the field user_time_out_duration.

In contrast, if the normal_complete_flag indicates 0, when the state of the button is changed from the normal state to the selected state, the display of the animation defined for the button in the normal state is discontinued upon receiving an instruction to change the state of the button without displaying the animation until the animation frame indicated by the normal_end_object_id_ref, and then, the button in the selected state is displayed.

The block selected_state_info( ) is now discussed. The block selected_state_info( ) includes, not only the fields corresponding to those in the field normal_state_info( ), but also, the field selected_state_sound_id_ref for specifying sound. The field selected_state_sound_id_ref has an 8-bit data length and represents a sound file to be played back for the button in the selected state. For example, the sound file is used as effect sound when the state of the button is changed from the normal state to the selected state.

The field selected_start_object_id_ref and the field selected_end_object_id_ref, each having a 16-bit data length, indicate the IDs for specifying the first object and the final object of animation of the button in the selected state.

The next flag selected_repeat_flag has a 1-bit data length and indicates whether the button animation is repeated. For example, if the flag selected_repeat_flag indicates 0, the animation is not repeated. If the flag selected repeat flag indicates 1, the animation is repeated.

As in the normal_complete_flag, the next flag selected_complete_flag has a 1-bit data length and is defined according to an embodiment of the present invention together with the flag normal_complete_flag. The flag selected_complete_flag controls the animation operation when the state of this button is changed from the selected state to another state. That is, the flag selected_complete_flag can be used when the state of the button is changed from the selected state to the activated state or from the selected state to the normal state.

As in the flag normal_complete_flag, if the flag selected_complete_flag indicates 1, all animation images defined in the selected state are displayed when the state of the button is changed from the selected state to another state. More specifically, if the flag selected_complete_flag indicates 1, in response to an instruction to change the state of the button from the selected state to another state while animation in the selected state is being displayed, animation frames are displayed starting from the animation frame displayed upon receiving this instruction to the animation frame indicated by the field selected_end_object_id_ref.

If the flag selected_complete_flag is 1 and if the selected_repeat_flag is 1, which means that animation is repeated, animation frames are displayed starting from the animation frame displayed upon receiving this instruction to the animation frame indicated by the field selected_end_object_id_ref.

In this case, even if the button is in the unselected state or the button image itself is turned OFF while animation is being displayed, the animation can continue to be displayed until the animation frame indicated by the field selected_end_object_id_ref, and then, the state of the button is changed.

The button is in the unselected state in a case where, for example, the selection of the button has become ineffective by the definition of the field selection_time_out_pts, or the menu is automatically initialized by the definition of the field user_time_out_duration.

In contrast, if the selected_complete_flag indicates 0, when the state of the button is changed from the selected state to another state, the display of the animation defined for the button in the selected state is discontinued upon receiving an instruction to change the state of the button without displaying the animation until the animation frame indicated by the selected_end_object_id_ref, and then, the button in another state is displayed.

In the next block activated_state_info( ), in contrast to the block normal_state_info( ) and the block selected_state_info( ), a flag indicating whether animation is repeated or a flag for controlling the animation operation when the state of a button is changed from the activated state to another state is not defined. When the state of the button is changed to the activated state, the function assigned to the activated button is executed, and the time for which the button is in the activated state is considered to be very short. Generally, controlling the button to be changed from the activated state to another state is not preferable. Accordingly, in the block activated_state_info( ), the above-described two flags are omitted. It is possible, however, that they may be defined.

In the activated_state_info( ), the field activated_state_sound_id_ref has an 8-bit data length and indicates a sound file to be played back for the button in the activated state. The field activated_start_object_id_ref and the field activated_end_object_id_ref, each having a 16-bit data length, indicate the IDs for specifying the first animation frame and the final animation frame, respectively, of the animation of this button in the activated state.

The subsequent field number_of_navigation_commands has a 16-bit data length and indicates the number of commands embedded in this button. The loop of the next FOR statement is repeated for the same number as that indicated by the number_of_navigation_commands, and then, the command navigation_command( ) executed by this button is defined. In other words, a plurality of commands can be executed from one button.

Figure 29:
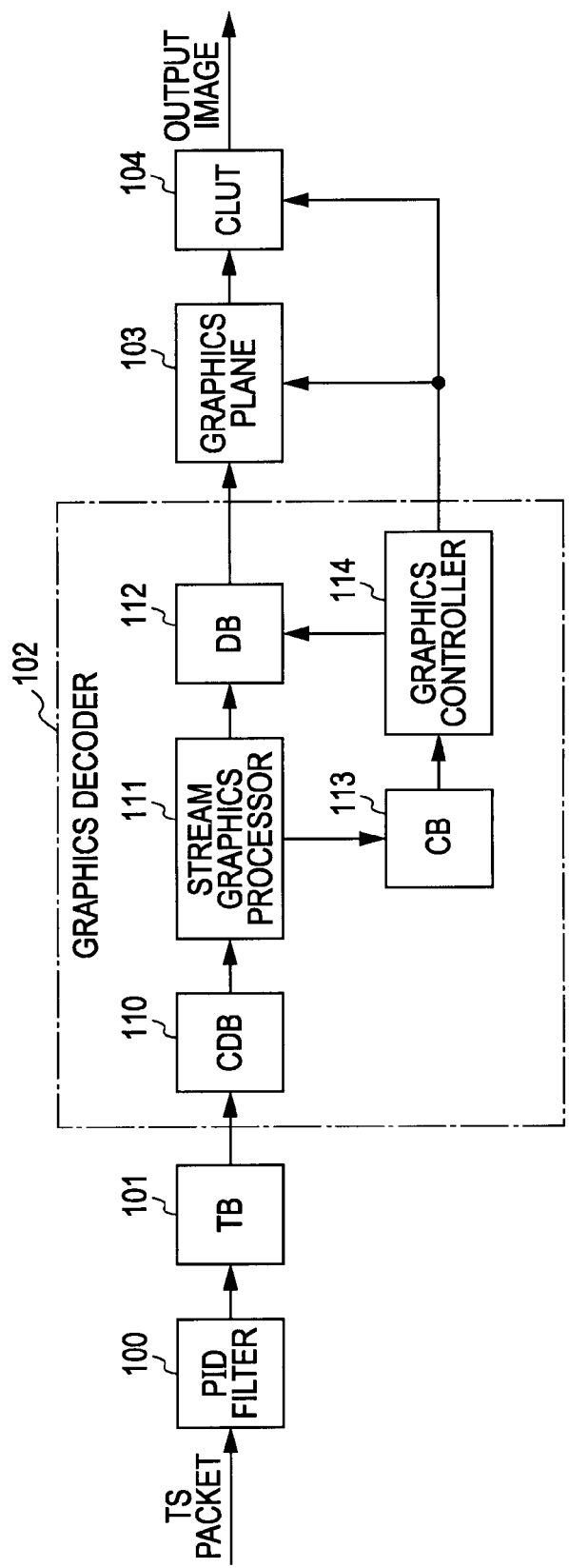
FIG. 29 is a block diagram illustrating an example of the configuration of a PG/IG-data decoder model defined in the current BD-ROM standards.

A description is now given of a decoder model for PG streams and IG streams defined in the current BD-ROM standards. FIG. 29 is a decoder model that is applicable to either of PG streams or IG streams.

A disc is first installed in a player, and then, an index file "index.bdmv" and a movie object file "MovieObject.bdmv" are read from the disc, and a top menu is displayed. When a title to be played back is specified on the basis of the top menu, a playlist file for playing back the specified title is called by the corresponding navigation command in the movie object file. Then, according to the description of the playlist file, a clip AV stream file, i.e., an MPEG2 transport stream, requested by the playlist is read from the disc.

The transport stream is supplied to a PID filter 100 as a TS packet, and the PID is analyzed. The PID filter 100 determines whether the supplied TS packet stores video data, audio data, menu data, or subtitle data. If the PID indicates menu data, i.e., IG data, or subtitles, i.e., PG data, the configuration of the decoder model shown in FIG. 29 becomes effective.

In the PID filter 100, a TS packet storing data compatible with the decoder model is selected from the transport stream, and is stored in a transport buffer (TB) 101. Then, in the TB 101, the data stored in the payload of the TS packet is extracted. When the number of data that can be reconstructed into a PES packet are stored in the TB 101, a PES packet is reconstructed based on the PID. That is, the segments divided into TS packets are unified into a PES packet.

The PES header is removed from the PES packet reconstructed from the segments, and the PES packet is supplied to a decoder 102 as an elementary stream, and is temporarily stored in a coded data buffer (CDB) 110. Among the elementary streams stored in the CDB 110, if there is an elementary stream which has reached the time indicated by the DTS on the basis of the STC, the elementary stream is read from the CDB 110 and is transferred to a stream graphics processor 111. The elementary stream is then decoded into segments.

The stream graphics processor 111 stores the decoded segments in a decoded object buffer (DB) 112 or a composition buffer (CB) 113. If the type of segment is a type provided with a DTS, such as a PCS, ICS, WDS, or ODS, the segment is stored in the DB 112 or the CB 113 in accordance with the time represented by the DTS. If the type of segment is a type without a DTS, such as PDS, the segment is immediately stored in the CB 113.

A graphics controller 114 controls segments. For example, if the decoder model is compatible with PG data, the graphics controller 114 reads the PCS from the CB 113 in accordance with the time represented by the PTS, and also reads the WDS and PDS referred to by the PCS. The graphics controller 114 also reads the ODS referred to by the PCS from the DB 112. Then, the graphics controller 114 decodes the read PCS, WDS, and ODS to form data for displaying subtitles, and then writes the data into a graphics plane 103.

Similarly, if the decoder model is a model compatible with IG data, the graphics controller 114 reads the ICS from the CB 113 in accordance with the time represented by the PTS corresponding to the ICS, and also reads the PDS referred to by the ICS. The graphics controller 114 also reads the ODS referred to by the ICS from the DB 112. The graphics controller 114 then decodes the read ICS and ODS to form data for displaying a menu screen, such as button images, and writes the data into the graphics plane 103.

The graphics controller 114 also decodes the PDS read from the CB 113 to form a color palette table discussed with reference to FIG. 13, and writes the color palette table into a color look-up table (CLUT) 104.

Images written into the graphics plane 103 are read at a predetermined time, such as a frame time, and color information is added to the images by referring to the color palette table of the CLUT 104 so that output image data is formed. The output image data is then output. Depending on the specifications of the player, color information based on the color palette table of the CLUT 104 may further be added to the image data read from the graphics plane 103 so that subtitle image data is formed, and the resulting subtitle image data may be written into the frame memory.

In accordance with the updating of an epoch, the graphics controller 114 clears the DB 112, the CB 113, the graphics plane 103, and the CLUT 104. The DB 112, the CB 113, the graphics plane 103, and the CLUT 104 are cleared when the field composition_state in the block composition_descriptor( ) in a PCS or an ICS read from the CDB 110 and decoded in the stream graphics processor 111 indicates that the corresponding display set is an epoch start display set. In accordance with the updating of an epoch, the CDB 110 may also be cleared.

The definition of the epochs is as follows. As stated above, in PG streams or IG streams, epochs are defined on the basis of an epoch start display set.

Regarding PG streams, the shorter one of the ranges of display sets in the following items (1) and (2) is defined as an epoch:

Item (1): a group of display sets starting from a display set in which an epoch start display set is defined in the PCS until the display set one before the display set in which the subsequent epoch start display set is defined in the PCS; and Item (2): a group of display sets starting from a display set in which an epoch start display set is defined in the PCS until the end of the playlist related to the corresponding PG data.

More specifically, in the case of item (1), an epoch is defined as a group of display sets starting from the PTS of the PCS in which an epoch start display set is defined until the PTS of the PCS in which the next epoch start display set is defined. Similarly, in the case of item (2), an epoch is defined as a group of display sets starting from the PTS of the PCS in which an epoch start display set is defined until the end of the playlist that refers to the group of display sets.

Regarding IG streams, the shortest one of the ranges of display sets in the following items (3), (4), and (5) is defined as an epoch:

Item (3): a group of display sets starting from a display set in which an epoch start display set is defined in the ICS until the time defined in the field composition_time_out_pts of the ICS;

Item (4): a group of display sets starting from a display set in which an epoch start display set is defined in the ICS until the display set one before the display set in which the subsequent epoch start display set is defined in the ICS; and Item (5): a group of display sets starting from a display set in which an epoch start display set is defined in the ICS until the end of the playlist related to the IG data.

Figure 30:
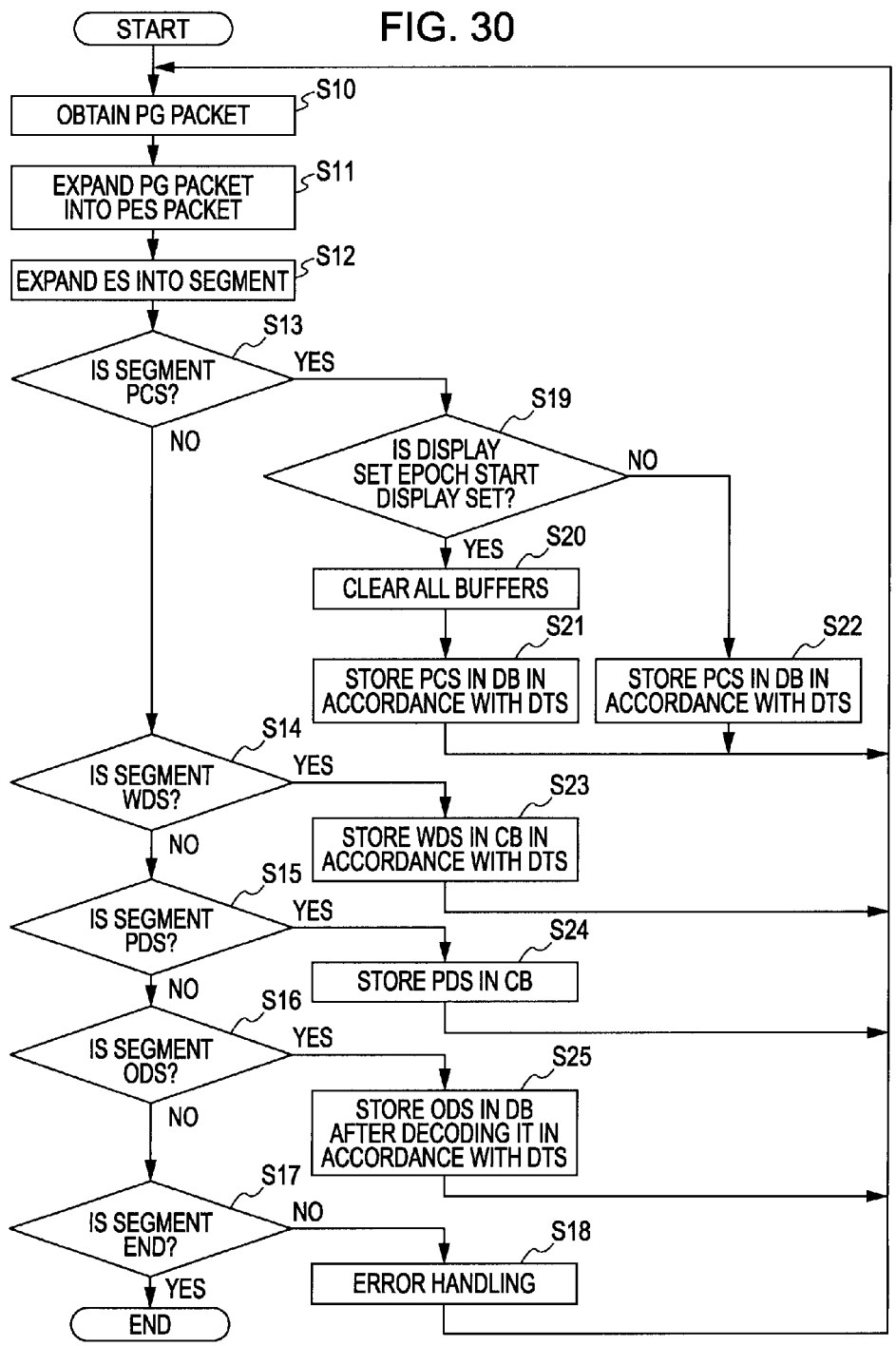
FIG. 30 is a flowchart illustrating an example of the processing performed by a PG decoder in units of display sets.

FIG. 30 is a flowchart illustrating processing performed by the graphics decoder 102 in units of display sets of PG data. In step S10, the PID filter 100 obtains a TS packet storing PG data from TS packets on the basis of the PID and stores the obtained TS packet in the TB 101. Then, in step S11, when a sufficient number of TS packets that can be reconstructed into a PES packet are stored in the TB 101, data is extracted from the payloads of the TS packets on the basis of the PIDs so that a PES packet is reconstructed. The PES header is then removed from the PES packet and the PES packet is transferred to the CDB 110 as an elementary stream.

In step S12, the stream graphics processor 111 expands the elementary stream extracted from the PES packet into segments. Then, in steps S13 through S17, it is determined whether the expanded segment is a PCS, a WDS, a PDS, an ODS, or an END segment respectively. The processing is then performed in accordance with a determination result. The type of segment can be determined, as discussed with reference to FIG. 19 or FIG. 21, on the basis of the first field segment_type in the first block segment_description( ) of the syntax. The types of segments of the WDS and ODS can also be determined in a similar manner, though it is not shown.

In step S13, it is determined whether the segment is a PCS. If the segment is found to be a PCS, the process proceeds to step S19 to determine, on the basis of the field composition_state in the block composition_descriptor( ) in the syntax of the PCS discussed with reference to FIG. 19, whether the display set containing this PCS is an epoch start display set.

If the display set is found to be an epoch start display set in step S19, the process proceeds to step S20. In step S20, the buffers related to the display of subtitles, for example, the DB 112 and the CB 113, are cleared. In this case, the CDB 110 may also be cleared. In step S21, the PCS is written into the CB 113 cleared in step S20 in accordance with the time represented by the DTS. Then, the process returns to step S10, and a subsequent packet is obtained.

If it is determined in step S19 that the display set containing this PCS is not an epoch start display set, the process proceeds to step S22 in which the PCS is written into the CB 113 in accordance with the time represented by the DTS. In this case, the PCS is written into a predetermined space of the CB 113.

If it is determined in step S13 that the segment is not a PCS, the process proceeds to step S14 to determine whether the segment is a WDS. If the segment is found to be a WDS, the process proceeds to step S23. In step S23, the WDS is written into the CB 113 in accordance with the time represented by the DTS. Then, the process returns to step S10, and a next packet is obtained. If it is determined in step S14 that the segment is not a WDS, the process proceeds to step S15 to determine whether the segment is a PDS.

If the segment is found to be PDS, the process proceeds to step S24. In step S24, the PDS is immediately written into the CB 113. Since the PDS does not have a DTS, but has a PTS, it is written into the CB 113 immediately after it is determined as a PDS. Then, the process returns to step S10, and a subsequent packet is obtained. If it is determined in step S15 that the segment is not a PDS, the process proceeds to step S16 to determine whether the segment is an ODS.

If the segment is found to be an ODS, the process proceeds to step S25. In step S25, the run-length processed bitmap data stored in the ODS is decoded in accordance with the time represented by the DTS, and is written into the DB 112. Then, the process returns to step S10, and a next packet is obtained. If it is determined in step S16 that the segment is not an ODS, the process proceeds to step S17 to determine whether the segment is an END segment, which is the end of the display set.

If the segment is found to be an END segment, the series of processing related to the display set is completed.

If it is determined in step S17 that the segment is not an END segment, the process proceeds to step S18. That is, it is determined that a certain error has occurred and predetermined error handling is performed.

In the above-described configuration, the PCS used for displaying subtitles is output from the CB 113 in accordance with the PTS defined in the PCS, and after the subtitles are displayed, the PCS is discarded from the CB 113. With this arrangement, however, if the user gives an instruction to turn OFF the display of the subtitles, it is difficult to redisplay the subtitles until the time reaches the PTS defined in the PCS even if the user attempts to redisplay the subtitles by turning ON the display of the subtitles.

Accordingly, a buffer for storing the currently active ODS is provided separately from the DB 112, and also, a buffer for storing the currently active PCS and PDS is provided separately from the CB 113. In response to an instruction to turn ON the display of the subtitles, a subtitle image and a color palette table are formed by the use of the ODS, PCS, and PDS stored in the buffers separately provided from the DB 112 and the CB 113, and are written into the graphics plane 103 and the CLUT 104, respectively.

Being "active" means the state in which the display of the corresponding segment is instructed by the PTS, and more specifically, the period from the PTS defined in a certain PCS to the PTS defined in the PCS subsequently used for displaying subtitles.

That is, the graphics controller 114 supplies a PCS output from the CB 113 in accordance with the PTS defined in the PCS to the graphics plane 103 and the CLUT 104, and also holds the PCS in the buffer separately provided from the CB 113 until the time reaches the PTS defined in the next PCS.

The same applies to the ODS. The graphics controller 114 supplies an ODS output from the DB 112 in accordance with the PTS to the graphics plane 103 and also holds the ODS in the buffer separately provided from the DB 112 until the time reaches the PTS defined in the next PCS.

With this configuration, if the display of the subtitles is reinstructed after the display of the subtitles is turned OFF by means of a user operation, the display of the subtitles can be immediately restarted in synchronization with an instruction to turn ON the display of the subtitles.

That is, in response to an instruction to turn ON the display of the subtitles after the display of the subtitles is turned OFF, the PCS is read from the buffer separately provided from the CB 113, and also, the ODS is read from the buffer separately provided from the DB 112, and a subtitle image is formed by the use of the read PCS and ODS. The subtitle image is then written into the graphics plane 103. The same applies to the PDS. The PDS is read from the buffer separately provided from the CB 113 in response to an instruction to turn ON the display of the subtitles, and a color palette table is formed by the use of the read PDS. The color palette table is then written into the CLUT 104.

Figure 31:
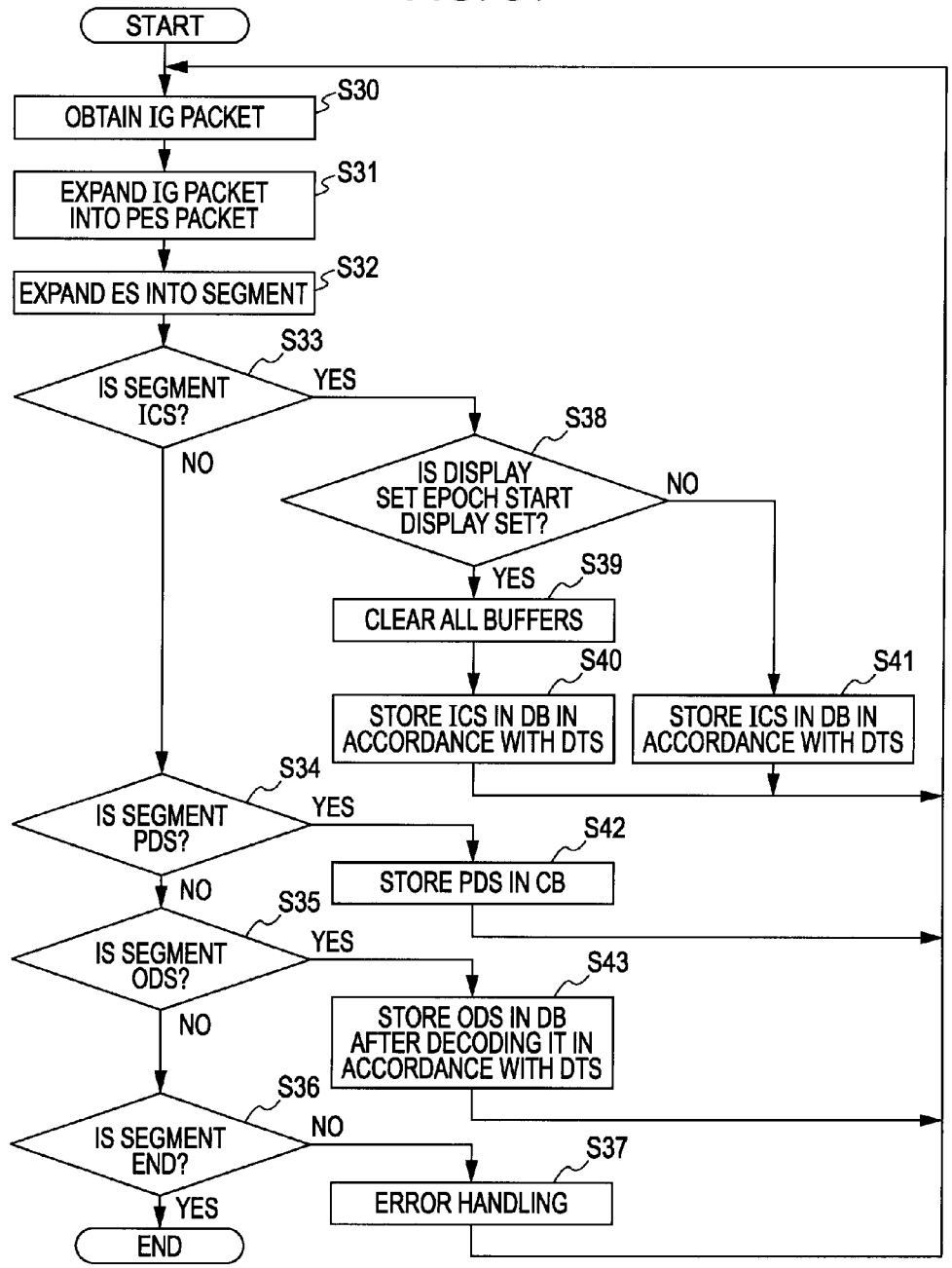
FIG. 31 is a flowchart illustrating an example of the processing performed by an IG decoder in units of display sets.

FIG. 31 is a flowchart illustrating processing performed by the graphics decoder 102 in units of display sets of IG data. The processing shown in FIG. 31 is similar to that for PG data shown in FIG. 30, except for the processing for the WDS, which is unique to the PG data.

In step S30, the PID filter 100 obtains a TS packet storing IG data from TS packets on the basis of the PID and stores the obtained TS packet in the TB 101. In step S31, data is extracted from the payload of the TS packet stored in the TB 101, and a PES packet is reconstructed. Then, the PES header is removed from the PES packet, and the PES packet is transferred to the CDB 110 as an elementary stream.

In step S32, the stream graphics processor 111 expands the elementary stream extracted from the PES packet into segments. Then, in steps S33 through S36, it is determined whether the expanded segment is an ICS, a PDS, an ODS, or an END segment, respectively, and the processing is performed in accordance with a determination result. The type of segment can be determined, as discussed with reference to FIG. 24, on the basis of the first block segment_description ( ) of the syntax. The type of segment of the ODS can also be determined in a similar manner, though it is not shown.

It is determined in step S33 whether the segment is an ICS. If the segment is found to be an ICS, the process proceeds to step S38 to determine, on the basis of the block composition_descriptor( ) in the syntax of the ICS discussed with reference to FIG. 24, whether the display set containing the ICS is an epoch start display set.

If the display set is found to be an epoch start display set in step S38, the process proceeds to step S39. In step S39, the buffers related to the menu display, for example, the DB 112 and the CB 113, are cleared. In this case, the CDB 110 may also be cleared. Then, in step S40, the ICS is written into the CB 113 cleared in step S39 in accordance with the time represented by the DTS. Then, the process returns to step S30, and a subsequent packet is obtained.

If it is determined in step S38 that the display set containing the ICS is not an epoch start display set, the process proceeds to step S41. In step S41, the ICS is written into the CB 113 in accordance with the time represented by the DTS. In this case, the ICS is written into a predetermined space of the CB 113.

If it is determined in step S33 that the segment is not an ICS, the process proceeds to step S34 to determine whether the segment is a PDS. If the segment is not a PDS, the process proceeds to step S35 to determine whether the segment is an ODS. If the segment is not an ODS, the process proceeds to step S36 to determine whether the segment is an END segment. If the segment is found to be a PDS in step S34, the PDS is immediately written into the CD 113 in step S42. If the segment is found to be an ODS in step S35, the ODS is decoded and written into the DB 112 in accordance with the time represented by the DTS in step S43.

In the decoder model defined in the BD-ROM standards, concerning PG data and IG data, segments are stored in the CDB 110. Then, each segment is decoded at the time represented by the DTS defined in the segment and is stored in the DB 112 or the CB 113, and is then output at the time represented by the PTS defined in the segment. Thus, when designing a player on the basis of the decoder model defined in the BD-ROM standards, the provision of a memory 200 storing the DTSs and PTSs corresponding to segments stored in the CDB 110 (hereinafter simply referred to as the "PTS/DTS buffer 200"), such as that shown in FIG. 32, should be taken into consideration. However, this does not mean that a buffer, which is physically provided separately from this decoder buffer, is necessary, and an existing memory may also be used as a buffer for storing PTSs and DTSs. For example, the CDB 110 may at least have a capacity of decoding data and a capacity of storing the DTSs and PTSs.

That is, if the PTS/DTS buffer 200 is used, a controller, which controls the player on the basis of the decoder model, specifies the decoding time for a segment stored in the CDB 110 on the basis of the DTS stored in the PTS/DTS buffer 200, and specifies the output time for a segment decoded and stored in the DB 112 or the CB 113 on the basis of the PTS stored in the PTS/DTS buffer 200. The PTS/DTS buffer 200 is not defined in the current BD-ROM standards.

FIG. 33 illustrates an example of the structure of data stored in the PTS/DTS buffer 200. In the PTS/DTS buffer 200, the DTS and PTS corresponding to a segment stored in the CDB 110 are stored, and also, the segment ID for identifying the segment is stored. The DTS and PTS each have a 33-bit data length according to the rules.

In the PTS/DTS buffer 200, other types of data may be stored for each segment. In the example shown in FIG. 33, version information concerning the version of the segment indicated by the segment ID and information concerning the segment type are stored. The information concerning the segment type indicates whether the segment is a PCS, PDS, WDS, or ODS in the case of PG data, and indicates whether the segment is an ICS, PDS, or an ODS in the case of IG data.

Among the fields shown in FIG. 33, if, for example, the data length of the segment ID is 16 bits, the data length of the version information is 8 bits, and the data length of the segment type is 4 bits, the data size per segment is 94 bits, i.e., 12 bytes in terms of bytes if it is rounded up.

Figure 32:
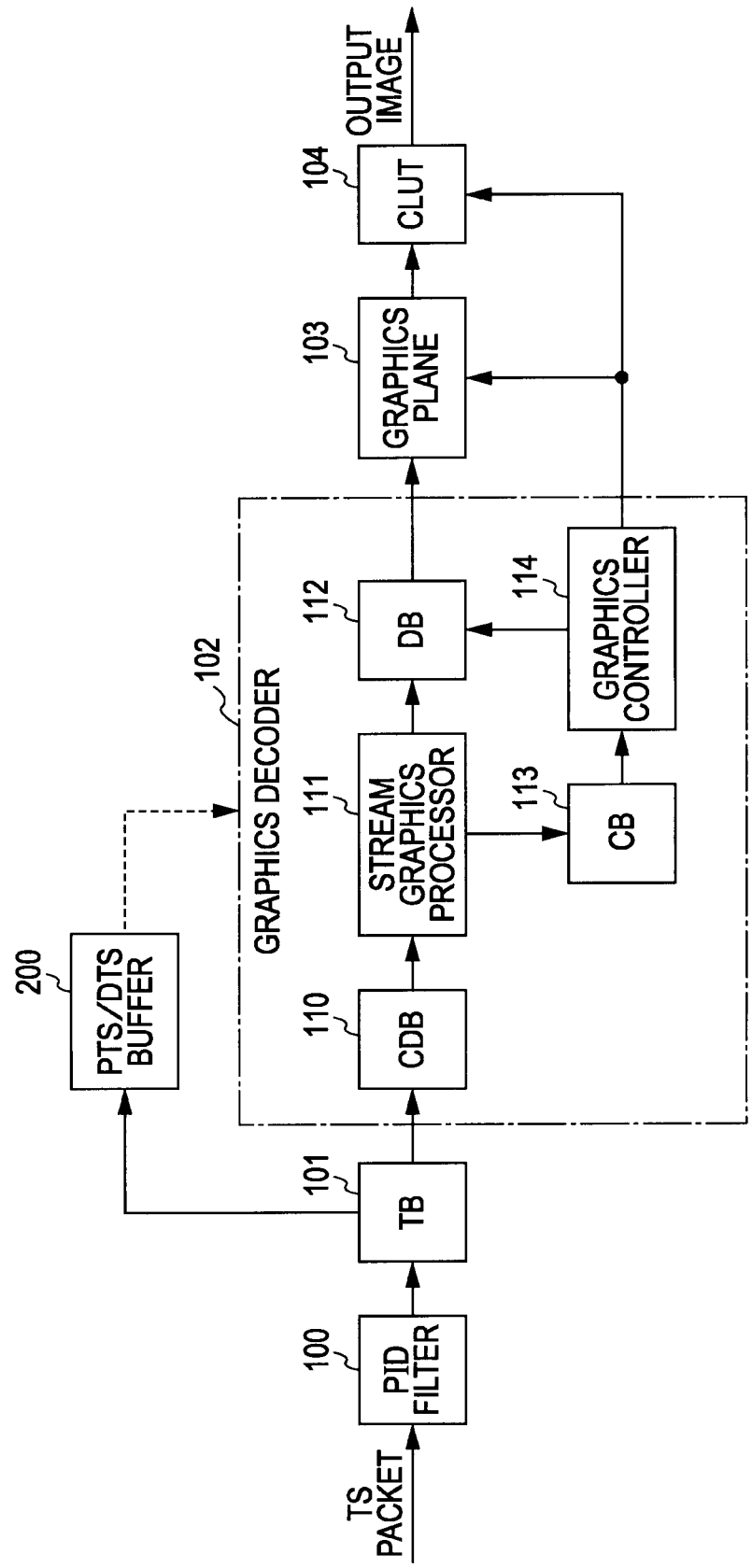
FIG. 32 is a block diagram illustrating an example of the configuration of a PG/IG-data decoder model according to an embodiment of the present invention.

When designing a player on the basis of the decoder model shown in FIG. 32, it is necessary to estimate the minimum capacity of each buffer and memory. The minimum capacities of the TB 101, the CDB 110, the DB 112, and the CB 113, which are buffers defined in the BD-ROM standards, are already defined in the BD-ROM standards. It is, however, necessary to estimate the minimum capacity of the PTS/DTS buffer 200, which is not defined in the BD-ROM standards.

As discussed above, since the data sizes of segments of PG data or IG data are variable, it is difficult to estimate how many segments can be stored in the CDB 110. Accordingly, it is also difficult to estimate the total number, i.e., the total size, of PTSs and DTSs corresponding to the segments stored in the CDB 110.

For example, if segments having a large size of data are filled in the CDB 110, the number of segments that can be stored in the CDB 110 becomes small, and thus, the total size of the PTSs and DTSs becomes small. Such a situation can be considered, for example, when, in the case of PG data, a large amount of subtitle image data is stored in an ODS, or when, in the case of IG data, an ICS having a large number of pages, commands, or buttons, is used or a large amount of image data is stored in an ODS.

On the other hand, if segments having a small data size are filled in the CDB 110, the number of segments that can be stored in the CDB 110 becomes large, and thus, the total size of the PTSs and DTSs becomes large. For example, in the case of IG data, if a large number of button image data used for animation display are used, the data size of each ODS storing the button image data becomes small, and on the other hand, the number of ODS becomes large and the number of PTSs and DTSs accordingly become large.

Additionally, in the case of an ICS or ODS, it is possible that the size of a segment be larger than the maximum size of a PES packet, i.e., 64 KB. In this case, as stated above, one segment is stored in a plurality of PES packets, in which case, a plurality of DTSs and PTSs are associated with one segment. This also makes it difficult to estimate the total size of the DTSs and PTSs on the basis of the capacity of the CDB 110.

In this embodiment, therefore, concerning each of PG data and IG data, the upper limit of the number of PTSs and DTSs that can be stored in the PTS/DTS buffer 200 is defined, and the minimum capacity of the PTS/DTS buffer 200 is defined on the basis of this upper limit.

The number of PTSs and DTSs that can be stored in the PTS/DTS buffer 200 corresponds to the number of segments stored in the CDB 110. Accordingly, the upper limit of the number of PTSs and DTSs that can be stored in the PTS/DTS buffer 200 can be determined on the basis of the upper limit of the number of segments that can be stored in the CDB 110. In accordance with the processing discussed with reference to FIG. 30 or 31, the segments of PG data or IG data stored in the CDB 110 in the form of elementary streams are decoded by the stream graphics processor 111 in accordance with the corresponding DTSs, and are stored in the DB 112 or the CB 113. The segments are then output from the DB 112 or the CB 113 in accordance with the corresponding PTSs. Accordingly, it is necessary to store the PTSs associated with the segments in the PTS/DTS buffer 200 until the segments are output from the DB 112 or the CB 113. Thus, the upper limit of the number of segments that can be stored in the CDB 110 can be determined on the basis of the number of segments that can be stored in the DB 112 and the CB 113. In other words, the upper limit of the number of PTSs and DTSs that can be stored in the PTS/DTS buffer 200 can be determined on the basis of the number of segments that can be stored in the DB 112 and the CB 113.

According to the BD-ROM standards, for each of PG data and IG data, the upper limit of the number of segments within one epoch is determined. Because of this upper limit, the number of subtitle image data that can be used in one epoch, in the case of PG data, can be restricted, and the number of pages, commands, or button image data that can be used in one epoch, in the case of IG data, can be determined. Based on the upper limit of the number of segments within one epoch for PG data or IG data, the number of segments that can be stored in the DB 112 and the CB 113 of a decoder model compatible with PG data or IG data, respectively, can be determined.

As stated above, the DB 112 or the CB 113 is cleared by an epoch start display set, as discussed with reference to the flowchart of FIG. 30 or 31.

The upper limit of the number of segments of PG data within an epoch is, for example, as follows, as shown in FIG. 34A: 8 PCSs, 1 WDS, 8 PDSs, 64 ODSs, and 8 END segments. Among those segments, since the END segments do not have a DTS and are not stored in the DB 112 or the CB 113, they are not counted toward calculating the minimum capacity of the PTS/DTS buffer 200. Since the PDSs do not have a DTS, but may be stored in the CB 113, they are counted toward calculating the minimum capacity of the PTS/DTS buffer 200. Accordingly, based on the upper limits of the numbers of PCSs, WDSs, PDSs, and ODSs, the minimum capacity of the PTS/DTS buffer 200 in a decoder model compatible with PG data can be estimated.

If all the fields of the data structure shown in FIG. 33 are stored in each segment, the data size becomes (8+1+8+64)× 12 bytes=972 bytes, and the minimum capacity of the PTS/ DTS buffer 200 in a decoder model compatible with PG data can be estimated at 972 bytes. Practically, a certain allowance is added to this minimum capacity. For example, if the upper limit of the number of segments of PG data within one epoch is about 128, the minimum capacity of the PTS/DTS buffer 200 can be estimated at about 1.6 KB.

The upper limit of the number of segments of IG data within one epoch is, for example, as follows, as shown in FIG. 34B: 1 ICS, 256 PDSs, 4096 ODSs, and 1 END segment. Among those segments, since the END segment does not have a DTS and is not stored in the DB 112 or the CB 113, it is not counted toward calculating the minimum capacity of the PTS/DTS buffer 200. Since the PDSs do not have a DTS, but may be stored in the CB 113, they are counted toward calculating the minimum capacity of the PTS/DTS buffer 200. Accordingly, based on the upper limits of the numbers of ICS, PDSs, and ODSS, the minimum capacity of the PTS/ DTS buffer 200 in a decoder model compatible with IG data can be estimated.

If all the fields of the data structure shown in FIG. 33 are stored in each segment, the data size becomes (1+256+4096)×12 bytes=52236 bytes, and the minimum capacity of the PTS/DTS buffer 200 in a decoder model compatible with IG data can be estimated at 52236 bytes. Practically, a certain allowance is added to this minimum capacity. For example, if the upper limit of the number of segments of IG data within one epoch is about 5120, the minimum capacity of the PTS/DTS buffer 200 can be estimated at about 64 KB.

The upper limits of the numbers of segments of PG data and IG data shown in FIGS. 34A and 34B, respectively, within one epoch are examples only, and are not restricted to the examples.

The PTS/DTS buffer 200 can be cleared for every epoch. For example, when the DB 112 and the CB 113 are cleared by an epoch start display set, as discussed with reference to the flowchart of FIG. 30 or 31, the PTS/DTS buffer 200 can also be cleared. Clearing the PTS/DTS buffer 200 for every epoch can fix the time at which data is cleared. This increases the simplicity of the decoder model.

Alternatively, the PTS/DTS buffer 200 may be controlled for each segment. For example, among PTSs or combinations of PTSs and DTSs stored in the PTS/DTS buffer 200, data whose playback time has passed the PTS is erased in units of segments. Clearing the PTS/DTS buffer 200 by the use of the PTS eliminates the need to store unnecessary data in the PTS/DTS buffer 200.

Figure 35:
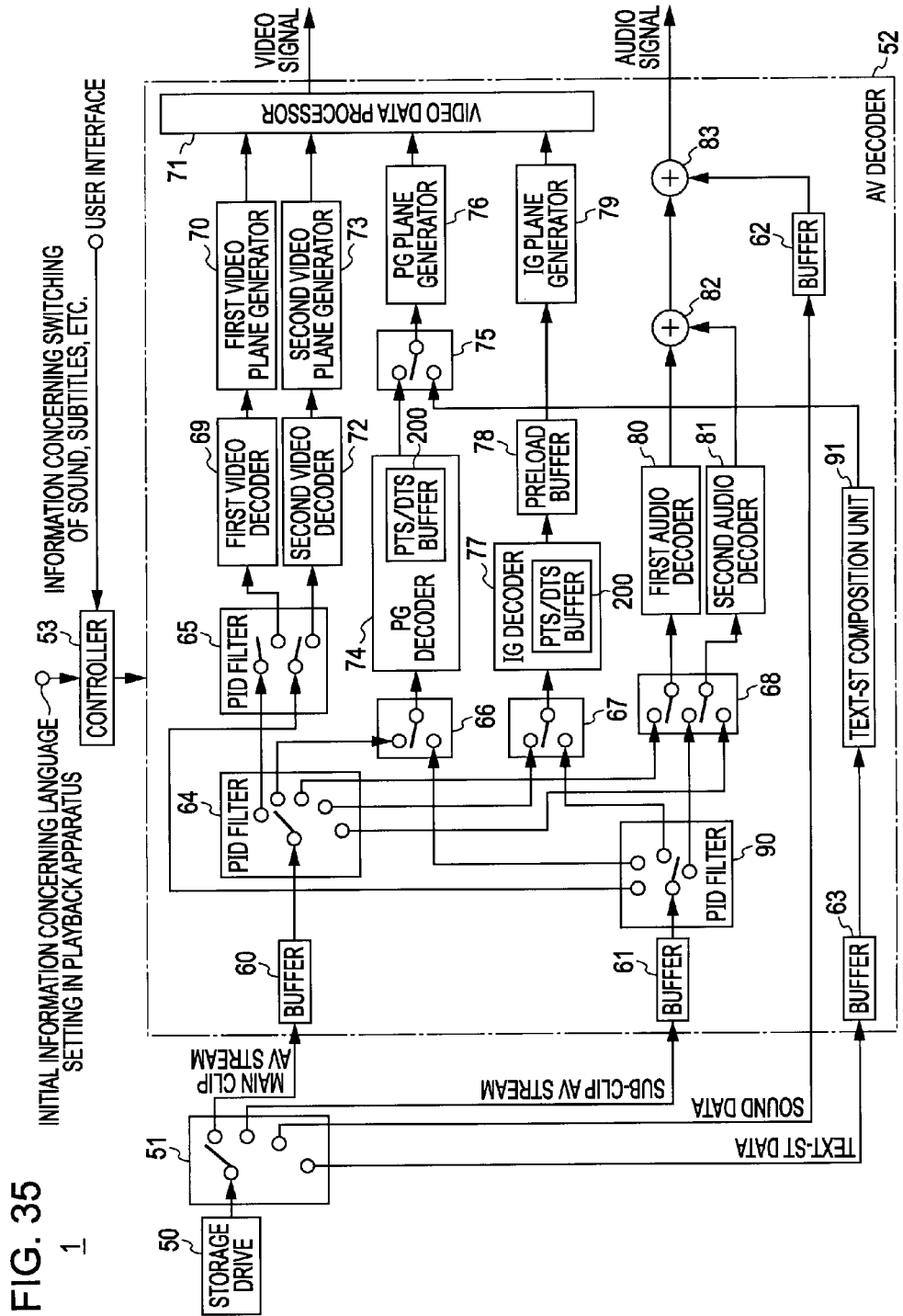
FIG. 35 is a block diagram illustrating an example of the configuration of a playback apparatus according to an embodiment of the present invention.

A playback apparatus applicable to an embodiment of the present invention is discussed below. FIG. 35 illustrates the configuration of a playback apparatus 1 applicable to an embodiment of the present invention. The playback apparatus 1 includes a storage drive 50, a switch circuit 51, an AV decoder 52, and a controller 53. The storage drive 50 can install the above-described BD-ROM therein and plays it back.

The controller 53 includes a central processing unit (CPU), a ROM in which a program running on the CPU is prestored, a random access memory (RAM) used as a work memory when the CPU executes the program, etc. With this configuration, the controller 53 controls the overall operation of the playback apparatus 1.

The playback apparatus 1 is provided with a user interface that provides predetermined control information to a user and also outputs a control signal in response to a user operation, though such a user interface is not shown. For example, a remote control commander that performs remote communication with the playback apparatus 1 via a predetermined wireless communication unit, for example, an infrared communication unit, is used as the user interface. On the remote commander, a plurality of input units, such as a direction key, e.g., a cross key, that can designate the up, down, left, and right directions, a numeric keyboard, and a function keyboard to which various functions are assigned, are provided.

The remote control commander generates a control signal in accordance with an operation performed on an input unit, and modulates the generated control signal to, for example, an infrared signal, and then, transmits the infrared signal. The playback apparatus 1 receives the infrared signal by an infrared receiver (not shown), and demodulates the infrared signal into an electric signal to reconstruct the original control signal. The control signal is then supplied to the controller 53. In response to this control signal, the controller 53 controls the operation of the playback apparatus 1 in accordance with the program.

The user interface is not restricted to a remote control commander, but may be a switch group provided on an operation panel of the playback apparatus 1. Alternatively, a communication unit that performs communication via, for example, a local area network (LAN), may be provided for the playback apparatus 1 as a user interface, and a signal supplied from an external computer via this communication unit may be supplied to the controller 53 as a control signal supplied from the user interface.

Initial information concerning language settings is stored in a non-volatile memory of the playback apparatus 1. The language-setting initial information is read out from the non-volatile memory and is supplied to the controller 53 when, for example, the playback apparatus 1 is powered ON.

When a disc is loaded in the storage drive 50, the controller 53 reads out the file "index.bdmv" and the file "MovieObject.bdmv" on the disc via the storage drive 50, and reads out the playlist file in the directory "PLAYLIST" on the basis of the description of the read files. The controller 53 then reads out the clip AV stream file referred to by the play item contained in the playlist file from the disc via the storage drive 50. If the playlist contains a sub-play item, the controller 53 also reads out the clip AV stream file and subtitle data referred to by the sub-play item from the disc via the storage drive 50.

Hereinafter, a clip AV stream corresponding to a sub-play item is referred to as a "sub-clip AV stream", and a clip AV stream corresponding to a main play item associated with a sub-play item is referred to as a "main clip AV stream".

The data output from the storage drive 50 is then demodulated by a demodulator (not shown) and is subjected to error correction processing by an error corrector (not shown) so that a multiplexed stream can be reconstructed. The multiplexed stream is a transport stream in which data is divided into small portions having a predetermined size after the data type and data order are identified by the PIDs and the small portions are time-division multiplexed. The multiplexed stream is supplied to the switch circuit 51. The controller 53 controls the switch circuit 51 to classify the data according to the type on the basis of the PIDs. More specifically, the controller 53 supplies main clip AV stream packets to a buffer 60, sub-clip AV stream packets to a buffer 61, sound data packets to a buffer 62, and text data packets to a buffer 63.

The main clip AV stream packets stored in the buffer 60 are read from the buffer 60 on a packet-by-packet basis under the control of the controller 53 and are supplied to a PID filter 64. The PID filter 64 classifies the packets on the basis of the PIDs of the packets into video stream packets, PG stream packets, IG stream packets, and audio stream packets.

The sub-clip AV stream packets stored in the buffer 61 are read from the buffer 61 on a packet-by-packet basis under the control of the controller 53 and are supplied to a PID filter 90. The PID filter 90 classifies the packets on the basis of the PIDs of the packets into video stream packets, PG stream packets, IG stream packets, and audio stream packets.

The video stream packets classified by the PID filter 64 and the video stream packets classified by the PID filter 90 are supplied to a PID filter 65, and are allocated according to the PIDs. That is, the PID filter 65 supplies main clip AV stream packets output from the PID filter 64 to a first video decoder 69, and supplies sub-clip AV stream packets output from the PID filter 90 to a second video decoder 72.

The first video decoder 69 extracts predetermined video streams from the payloads of the supplied packets and decodes the MPEG2 compressed codes of the extracted video streams. The first video decoder 69 then outputs the decoded data to a first video plane generator 70, and a video plane is generated. In this case, a video plane is generated by, for example, writing one frame of baseband digital video data into a frame memory. The video plane generated in the first video plane generator 70 is supplied to a video data processor 71.

The processing similar to that performed by the first video decoder 69 and the first video plane generator 70 is performed by the second video decoder 72 and a second video plane generator 73, respectively, so that a video stream is decoded and a video plane is generated. The video plane generated in the second video plane generator 73 is supplied to the video data processor 71.

The video data processor 71 inserts the video plane generated in the first video plane generator 70 and the video plane generated in the second video plane generator 73 into one frame to generate one video plane. A video plane may be generated by selectively using the video plane generated in the first video plane generator 70 and the video plane generated in the second video plane generator 73. The generated video plane corresponds to, for example, the moving picture plane 10 shown in FIG. 9.

PG stream packets classified by the PID filter 64 and PG stream packets classified by the PID filter 90 are supplied to a switch circuit 66, and one type of the PG stream packets is selected and is supplied to a PG decoder 74.

The PG decoder 74 corresponds to the graphics decoder 102 in the decoder model discussed with reference to FIG. 32. In this case, the PID filter 100 and the TB 101 shown in FIG. 32 correspond to the PID filter 64 and a buffer (not shown), respectively. Alternatively, the PID filter 100 and the TB 101 may be included in the PG decoder 74.

In the example shown in FIG. 35, the PTS/DTS buffer 200 is included in the PG decoder 74. Alternatively, the PTS/DTS buffer 200 may be included in a predetermined area of the RAM of the controller 53. In this case, the controller 35 reserves a minimum capacity of the PTS/DTS buffer 200 for PG data, which is defined as described above, in the RAM.

The PG decoder 74 extracts predetermined PG stream packets from the payloads of the supplied packets and decodes the PG stream packets to generate graphics data used for displaying subtitles. The PG decoder 74 then supplies the graphics data to a switch circuit 75. That is, the PG decoder 74 extracts data from the payloads of the supplied packets and reconstructs a PES packet on the basis of the PIDs. If DTSs and/or PTSs are contained in the header of the reconstructed PES packet, the PG decoder 74 extracts the DTSs and/or PTSs and stores them in the PTS/DTS buffer 200, and also decodes the data of the payloads to form a PCS, WDS, PDS, and ODS. The PCS, WDS, PDS, and ODS are stored in the DB 112 or the CB 113 at the time represented by the corresponding DTSs, and are output from the PG decoder 74 at the time represented by the corresponding PTSs. The PCS, WDS, PDS, and ODS are supplied to the switch circuit 75.

The switch circuit 75 selects the predetermined graphics data and subtitle data in the form of text data, which is discussed below, and supplies the selected data to a PG plane generator 76. The PG plane generator 76 generates a PG plane on the basis of the supplied data and supplies the PG plane to the video data processor 71. The PG plane corresponds to, for example, the subtitle plane 11 discussed with reference to FIG. 9 and also corresponds to the subtitle image stored in the graphics plane 103 discussed with reference to FIG. 29.

The IG stream packets classified by the PID filter 64 and the IG stream packets classified by the PID filter 90 are supplied to a switch circuit 67, and one type of the IG stream packets is selected and is supplied to an IG decoder 77.

The IG decoder 77 corresponds to the graphics decoder 102 in the decoder model discussed with reference to FIG. 32. In this case, the PID filter 100 and the TB 101 shown in FIG. 32 correspond to the switch circuit 67 and a buffer (not shown), respectively. Alternatively, the PID filter 100 and the TB 101 may be included in the IG decoder 77.

In the example shown in FIG. 35, the PTS/DTS buffer 200 is included in the IG decoder 77. Alternatively, the PTS/DTS buffer 200 may be included in a predetermined area of the RAM of the controller 53. In this case, the controller 35 reserves a minimum capacity of the PTS/DTS buffer 200 for IG data, which is defined as described above, in the RAM.

The IG decoder 77 extracts an ICS, PDS, and ODS from the supplied IG stream packets and decodes the ICS, PDS, and ODS. For example, the IG decoder 77 extracts data from the payloads of the supplied packets and reconstructs a PES packet on the basis of the PIDs. If DTSs and/or PTSs are contained in the header of the reconstructed PES packet, the IG decoder 77 extracts the DTSs and/or PTSs and stores them in the PTS/DTS buffer 200, and also decodes the data of the payloads to form an ICS, PDS, and ODS of the IG stream packets. The ICS and ODS are decoded at the time represented by the corresponding DTSs stored in the PTS/DTS buffer 200 and are then stored in the DB 112. The PDS is immediately decoded and stored in the CB 113.

In the IG decoder 77, the corresponding segments are read out from the DB 112 or the CB 113 at the time represented by the PTSs stored in the PTS/DTS buffer 200, and are supplied to an IG plane generator 79 via a preload buffer 78. The IG plane generator 79 generates an IG plane on the basis of the supplied segments. This IG plane corresponds to, for example, the IG plane 12 discussed with reference to FIG. 9.

The video data processor 71 includes, for example, the graphics processor discussed with reference to FIG. 11, and combines the video plane (moving picture plane 10 shown in FIG. 11), the PG plane (subtitle plane 11 shown in FIG. 11), and the IG plane (IG plane 12 shown in FIG. 11) to form one piece of image data, and outputs the image data as a video signal.

This is discussed in detail below in the context of a PG plane (i.e., subtitle image) with reference to FIG. 11. The palette 22A, the RGB/YCbCr conversion circuit 22B, and the multiplier 23 correspond to the CLUT 104 discussed with reference to FIG. 32. Color information is added to the PG plane in the palette 22A and the RGB/YCbCr conversion circuit 22B, and opacity information is added to the PG plane in the multiplier 23. The resulting PG plane is then combined with the video plane and the IG plane in the adder 24 and the adder 28, respectively, so that one piece of image data is output.

The audio streams classified by the PID filter 64 and the audio stream classified by the PID filter 90 are supplied to a switch circuit 68. The switch circuit 68 changes the switches of the switch circuit 68 so that one type of the audio streams is supplied to a first audio decoder 80 and the other type of the audio streams is supplied to a second audio decoder 81. The audio streams decoded in the first audio decoder 80 and the second audio decoder 81 are combined in an adder 82 and the added audio stream is further combined with sound data read from the buffer 62 in an adder 83. The resulting audio signal is then output.

The text data read from the buffer 63 is processed in a text-ST composition unit 91 and is supplied to the switch circuit 75.

In the above-described embodiment, the elements forming the playback apparatus 1 are constructed by hardware. However, the playback apparatus 1 may be implemented by software processing executed on a computer. In this case, the playback apparatus 1 can be operated on a computer. Alternatively, the playback apparatus 1 may be implemented by a combination of hardware and software. For example, the decoders of the playback apparatus 1, in particular, the first video decoder 69 and the second video decoder 72, which have a processing load greater than that of the other elements, may be formed by hardware, and the other elements may be formed by software. In this case, the PTS/DTS buffer 200 is formed as a predetermined area of the memory of the computer.

In the above-described embodiment, video data, audio data, PG streams, and IG streams are read from a disc-type recording medium, such as an optical disc. Alternatively, for example, the entirety or part of the data may be stored in a recording medium other than an optical disc, such as a hard disk drive or a semiconductor memory provided with the playback apparatus 1, and the data can be read from such a recording medium.

The playback apparatus 1 may be constructed only by software or by a combination of hardware and software, and a program executed on a computer may be recorded on a recording medium, such as a compact disc read only memory (CD-ROM) or a digital versatile disc read only memory (DVD-ROM). This recording medium may be loaded in a drive of the computer and the program recorded on the recording medium may be installed in the computer. With this configuration, the above-described processing can be executed on the computer. The program may be recorded on a BD-ROM. The configuration of the computer is known, and an explanation thereof is thus omitted.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus comprising:
an input section that receives content data and accompanying data which is formed on the basis of a plurality of first items, the accompanying data being used for displaying information accompanying the content data;
a first storage section that stores, among the plurality of first items forming the accompanying data received by the input section, a first item for which decoding time information concerning a decoding time is defined;
a time information storage section that stores the decoding time information independently from the storage of the first item;
a decoder that obtains the first item from the first storage section and decodes the first item in accordance with the decoding time information stored in the time information storage section; and
a second storage section that stores the first item decoded by the decoder,
wherein the time information storage section has at least a capacity to store a number of decoding time information entries, the capacity being based on an upper limit of the number of first items stored in the first storage section.

2. The playback apparatus according to claim 1, wherein, in the accompanying data, an output time is also defined, and the time information storage section also stores output time information concerning the output time extracted from the accompanying data, and
the first item decoded by the decoder and stored in the second storage section is output from the second storage section in accordance with the output time information stored in the time information storage section.

3. The playback apparatus according to claim 1, wherein the accompanying data includes graphics data to be displayed by being overlaid on a main image represented by the content data, an output time being defined in the graphics data.

4. The playback apparatus according to claim 1, wherein the accompanying data includes a button image that implements animation display and that is used for displaying a button used for an operation screen instructing a user to perform an operation, and also includes display control information concerning the button image.

5. The playback apparatus according to claim 1, wherein the second storage section includes a third storage section that stores information for forming image data displayed by the use of the accompanying data, and a fourth storage section that stores attribute information concerning the image data displayed by the use of the accompanying data, and
an upper limit of the number of first items stored in the first storage section is determined on the basis of an upper limit of the number of items of the information for forming the image data stored in the third storage section and an upper limit of the number of items of the attribute information concerning the image data stored in the fourth storage section.

6. The playback apparatus according to claim 1, wherein, in the first item, structure information concerning a structure of the accompanying data, attribute information concerning attributes of the accompanying data, image information concerning the accompanying data, or breakpoint information concerning breakpoints of the accompanying data is defined,
a second unit is formed from the plurality of first items including one item of the structure information and one item of the breakpoint information,
a third unit is formed from one or the plurality of second units including one or a plurality items of the attribute information, and
the accompanying data is a set of the third units.

7. The playback apparatus according to claim 6, wherein the decoding time information is defined for the first item, and is stored in a packet header of a packet including the first unit.

8. The playback apparatus according to claim 6, wherein the decoding time information is defined for the first item in which the structure information or the image information is stored.

9. The playback apparatus according to claim 8, wherein the decoding time information is also defined for the first item in which the attribute information is stored.

10. The playback apparatus according to claim 6, wherein an upper limit of the number of first items stored in the first storage section is determined on the basis of the number of first items that can be stored in the third unit, the first items storing therein the structure information, the attribute information, or the image information.

11. The playback apparatus according to claim 6, wherein the second storage section is cleared for every third unit.

12. The playback apparatus according to claim 6, wherein, in the accompanying data, an output time is also defined, and the time information storage section also stores output time information concerning the output time extracted from the accompanying data,
the first unit decoded by the decoder and stored in the second storage section is output from the second storage section in accordance with the output time information stored in the time information storage section, and
the time information storage section is cleared for every first item after the accompanying data including the first items stored in the second storage section is displayed on the basis of the output time information stored in the time information storage section.

13. The playback apparatus according to claim 12, wherein, in the time information storage section, identification information for associating the decoding time information with the first items is also stored, and
the identification information is cleared for every first item after the accompanying data including the first items stored in the second storage section is displayed on the basis of the output time information stored in the time information storage section.

14. The playback apparatus according to claim 6, wherein the decoding time information which is defined in the first items included in the third unit and which is stored in the time information storage section is cleared for every third unit.

15. The playback apparatus according to claim 14, wherein, in the time information storage section, identification information for associating the decoding time information with the first items is also stored, and
when the decoding time information is cleared, the identification information corresponding to the decoding time information is also cleared.

16. A playback method comprising the steps of:
receiving content data and accompanying data which is formed on the basis of a plurality of first items, the accompanying data being used for displaying information accompanying the content data;
storing in a first storage section, among the plurality of first items forming the received accompanying data, a first item for which decoding time information concerning a decoding time is defined;
storing the decoding time information in a time information storage section independently from the storing of the first item;

extracting the first item from the first storage section and decoding the first item in accordance with the decoding time information stored in the time information storage section; and storing the decoded first item in a second storage section, wherein the time information storage has at least a capacity to store a number of decoding time information entries, the capacity being based on an upper limit of the number of first items stored in the first storage section.

17. A non-transitory computer readable medium having stored thereon a playback program that when executed by a computer causes the computer to execute a playback method comprising the steps of:

receiving content data and accompanying data which is formed on the basis of a plurality of first items, the accompanying data being used for displaying information accompanying the content data;

storing in a first storage section, among the plurality of first items forming the received accompanying data, a first item for which decoding time information concerning a decoding time is defined;

storing the decoding time information in a time information storage section independently from the storing of the first item;

extracting the first item from the first storage section and decoding the first item in accordance with the decoding time information stored in the time information storage section; and storing the decoded first item in a second storage section, wherein the time information storage has at least a capacity to store a number of decoding time information entries, the capacity being based on an upper limit of the number of first items stored in the first storage section.

* * * * *